US009459966B2

(12) United States Patent
Uchiyama

(10) Patent No.: US 9,459,966 B2
(45) Date of Patent: Oct. 4, 2016

(54) STORAGE CONTROL APPARATUS AND STORAGE SYSTEM

(71) Applicant: FUJITSU LIMITED, Kawasaki-shi, Kanagawa (JP)

(72) Inventor: Kenji Uchiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 331 days.

(21) Appl. No.: 14/174,894

(22) Filed: Feb. 7, 2014

(65) Prior Publication Data
US 2014/0281796 A1    Sep. 18, 2014

(30) Foreign Application Priority Data

Mar. 18, 2013   (JP) ................ 2013-055071

(51) Int. Cl.
*G06F 11/14* (2006.01)
*G06F 11/10* (2006.01)
*G06F 11/30* (2006.01)

(52) U.S. Cl.
CPC ....... *G06F 11/1448* (2013.01); *G06F 11/1004* (2013.01); *G06F 11/1469* (2013.01); *G06F 11/1456* (2013.01); *G06F 2201/815* (2013.01)

(58) Field of Classification Search
CPC ........... G06F 11/1448; G06F 11/1004; G06F 11/1469; G06F 11/1456; G06F 2201/815
See application file for complete search history.

(56) References Cited

U.S. PATENT DOCUMENTS

| 2007/0180294 A1* | 8/2007 | Kameyama et al. | G06F 11/1076 714/6.12 |
| 2008/0288809 A1* | 11/2008 | Koguchi et al. | G06F 11/1012 714/2 |
| 2008/0301519 A1* | 12/2008 | Kawabata | G06F 11/1008 714/755 |

FOREIGN PATENT DOCUMENTS

| JP | H07/146759 A | 6/1995 |
| JP | 2000-353118 A | 12/2000 |
| JP | 2003/150325 A | 5/2003 |

\* cited by examiner

*Primary Examiner* — April Y Blair
*Assistant Examiner* — Dipakkumar Gandhi
(74) *Attorney, Agent, or Firm* — Fujitsu Patent Center

(57) ABSTRACT

A processor generates a parity from dummy data attached to a first piece of data of a plurality of pieces of data and a piece of data other than the first piece of data when writing the plurality of pieces of data into a first storage apparatus. Then, the processor stores the parity in a second storage apparatus. The processor performs a reading-out process in parallel with a restoration process when reading out the plurality of pieces of data from the first storage apparatus and writing them into the second storage apparatus. The reading-out process is a process to read out the first piece of data from the first storage apparatus and to write it into the second storage apparatus, and the restoration process is a process to restore a second piece of data among the plurality of pieces of data by using the dummy data and the parity.

10 Claims, 45 Drawing Sheets

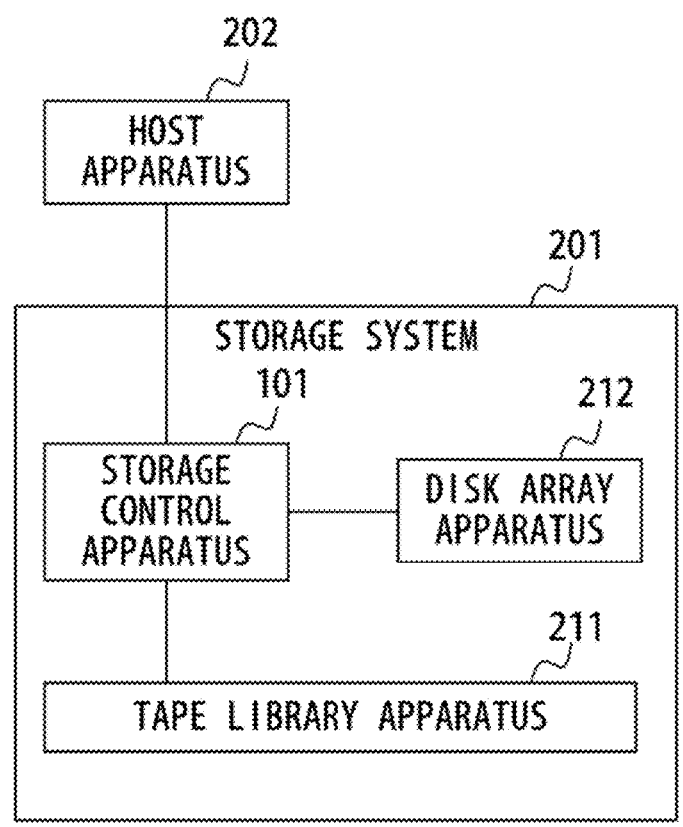
F I G. 2

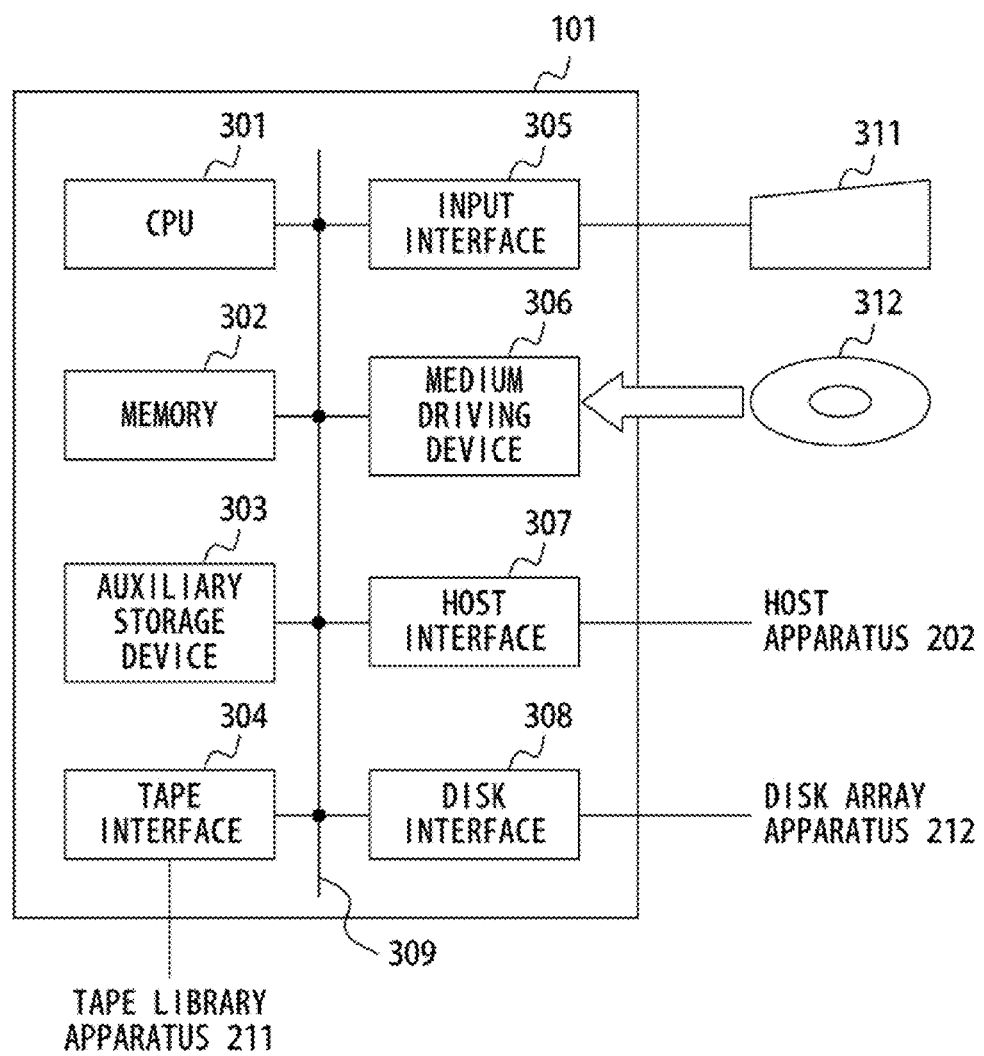
F I G. 3

| LV NUMBER |
|---|
| STORAGE DESTINATION TAPE NUMBER |
| LV SIZE |
| BEGINNING ADDRESS |

FIG. 4

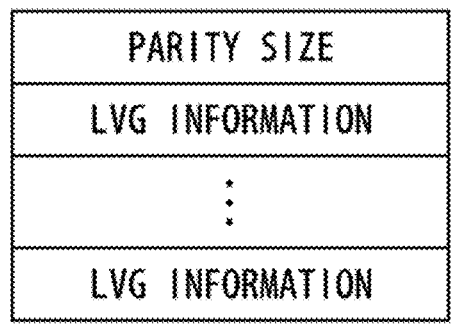
F I G. 5

| LVG NUMBER |
| --- |
| NUMBER OF LVs |
| LV LIST |
| PARITY TYPE |
| LV SIZE 1 |
| LV SIZE 2 |
| LV SIZE 3 |
| LV SIZE 4 |
| NUMBER OF LINES |
| LINE INFORMATION |
| ⋮ |
| LINE INFORMATION |

FIG. 6

| LINE NUMBER |
|---|
| NUMBER OF LVs |
| LV LIST |
| STORAGE ADDRESS INFORMATION |
| ⋮ |
| STORAGE ADDRESS INFORMATION |

FIG. 7

| LV NUMBER |
| BEGINNING ADDRESS |
| ENDING ADDRESS |

F I G. 8

| |
|---|
| LVG NUMBER |
| LINE NUMBER BEING READ OUT |
| LINE NUMBER 1 BEING RESTORED |
| LINE NUMBER 2 BEING RESTORED |
| INITIAL INTERVAL VALUE 1 |
| INITIAL INTERVAL VALUE 2 |
| READING-OUT PROCESSING SPEED |
| RESTORATION PROCESSING SPEED 1 |
| RESTORATION PROCESSING SPEED 2 |

FIG. 9

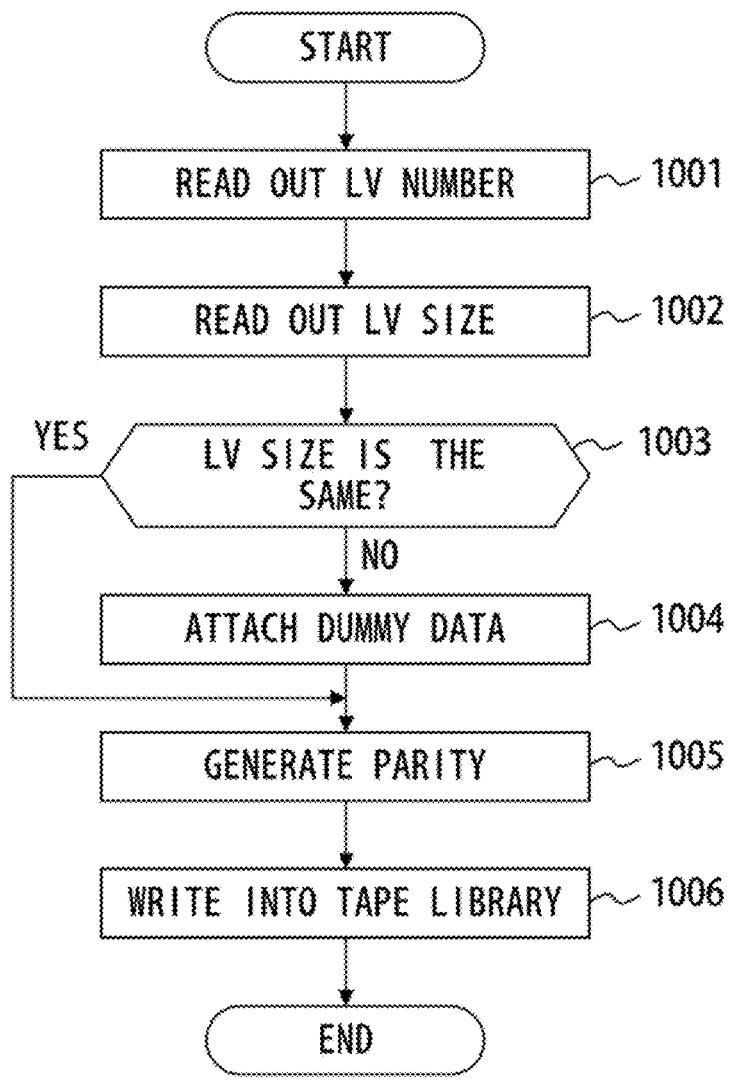
F I G. 10

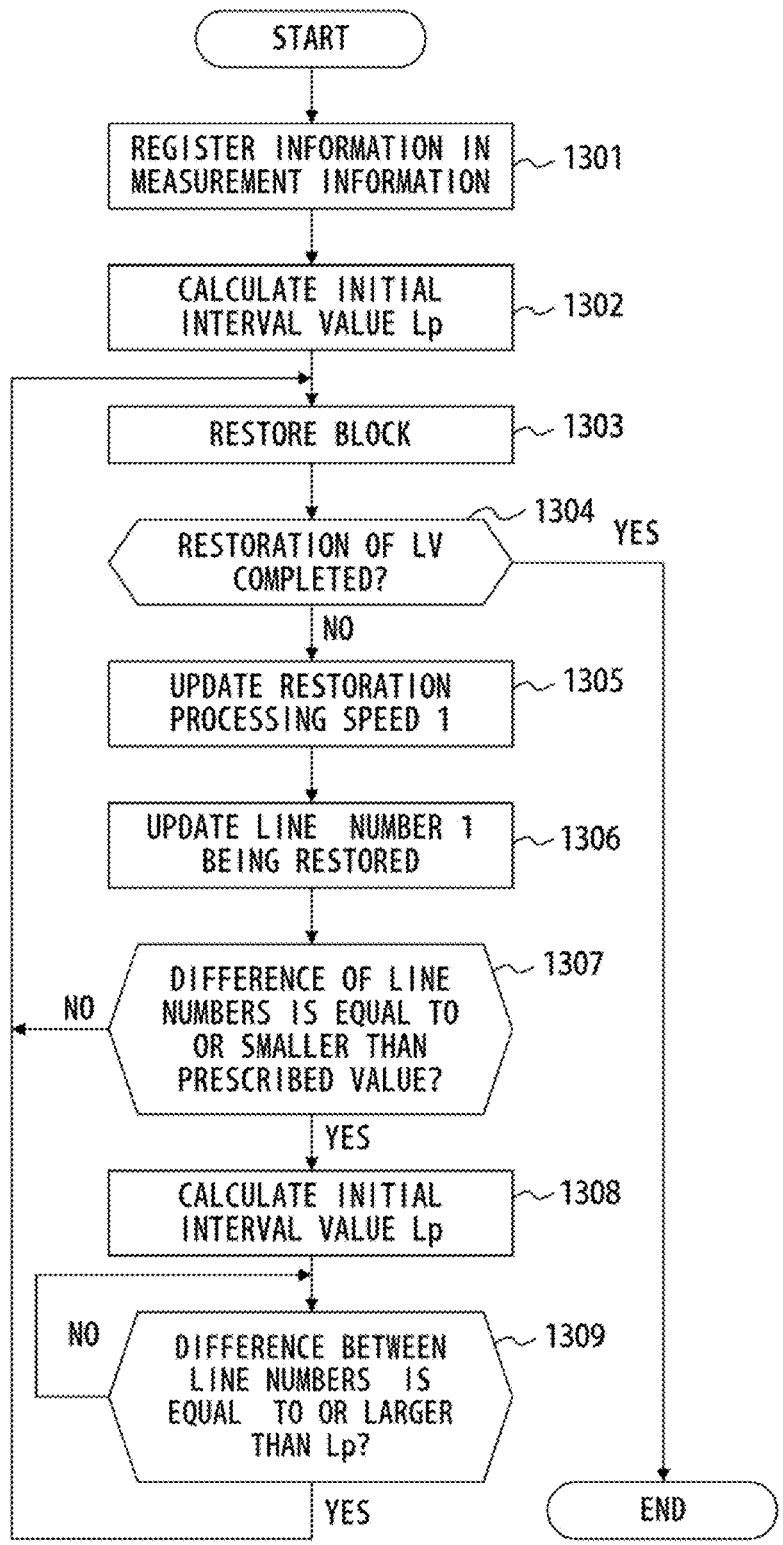
F I G. 13

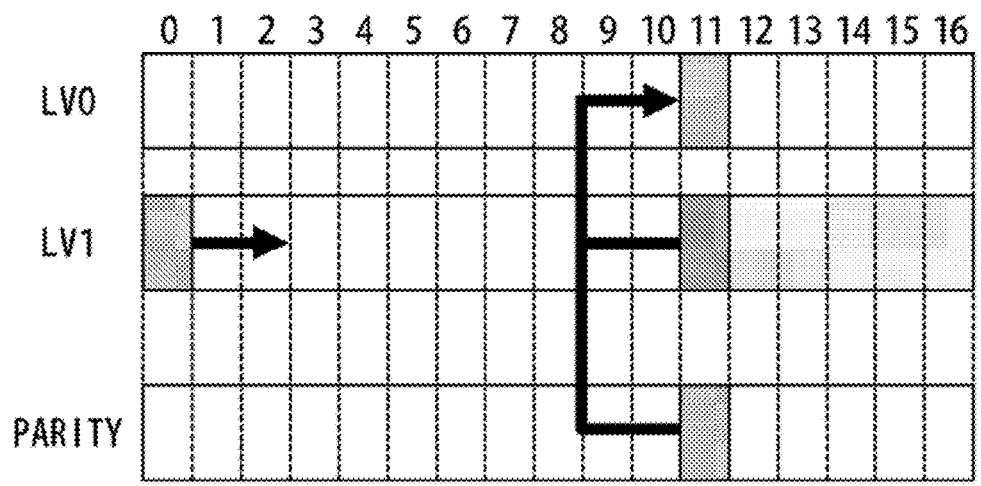
F I G. 14

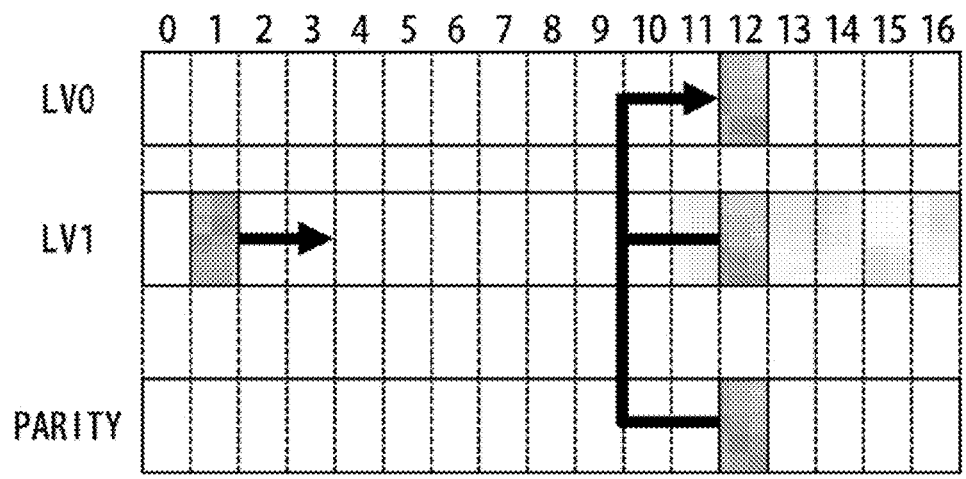
F I G. 1 5

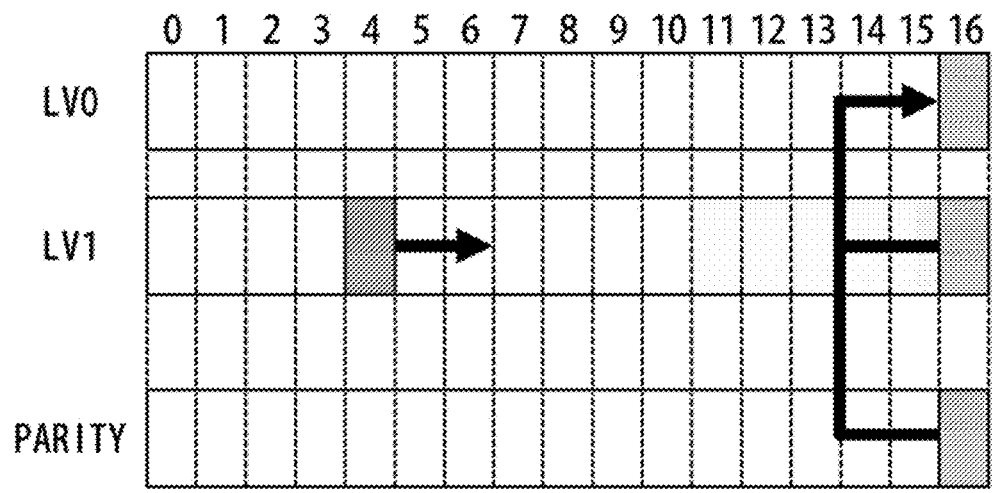
F I G. 16

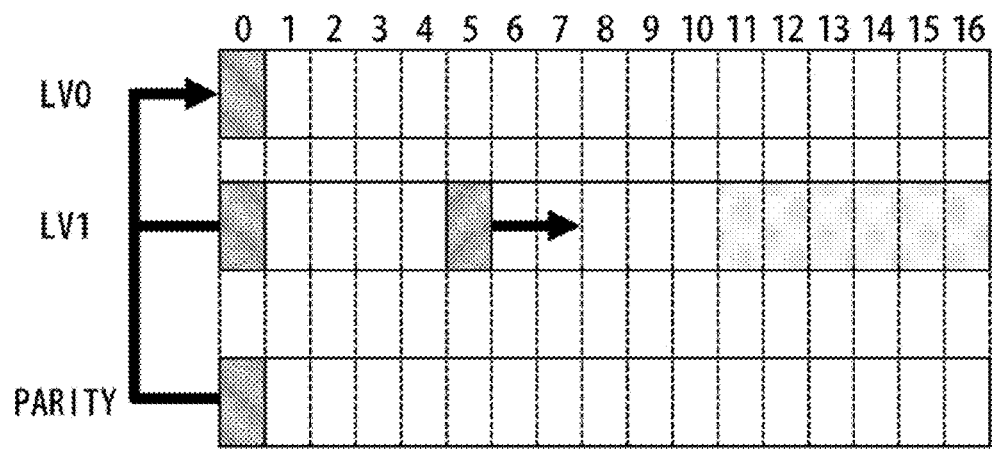
F I G. 17

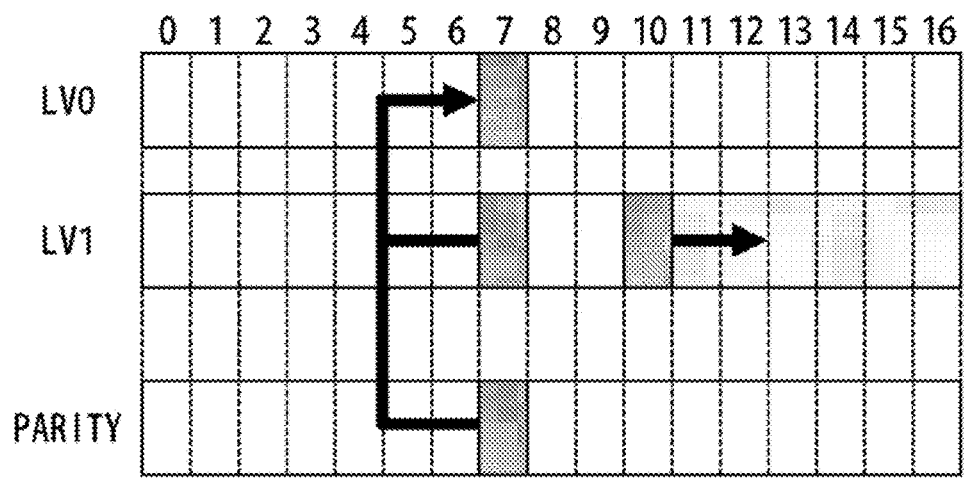
F I G. 18

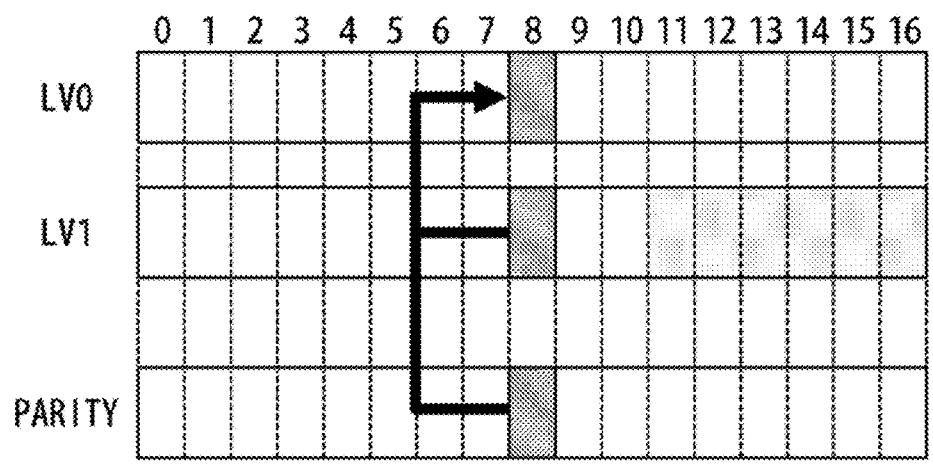
F I G. 19

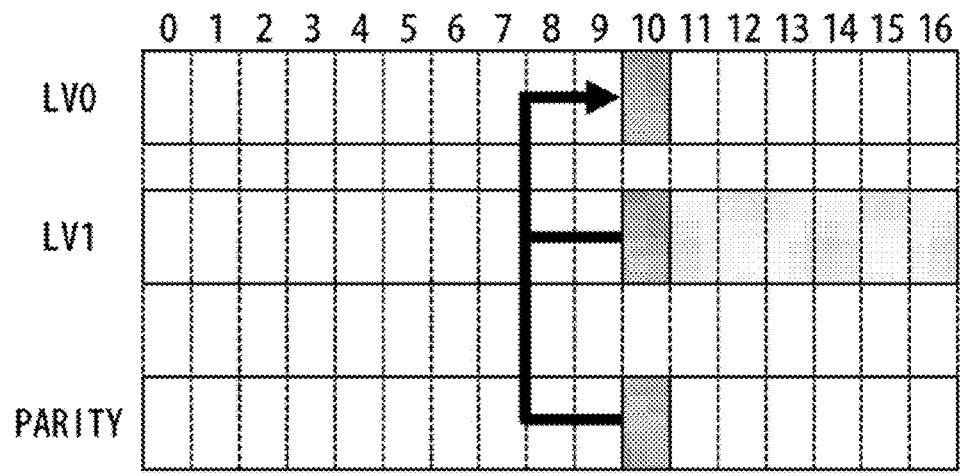
F I G. 20

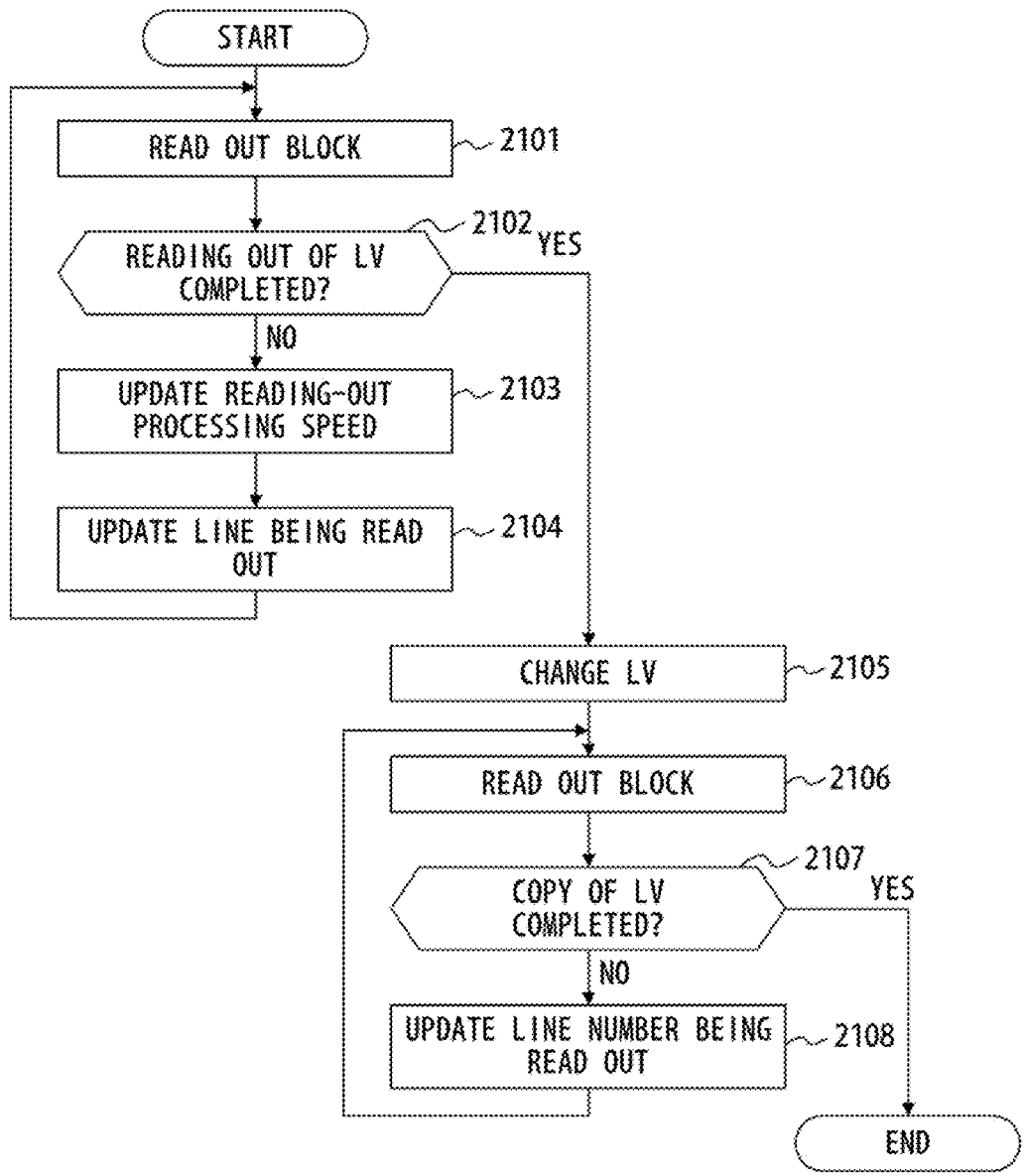
F I G. 21

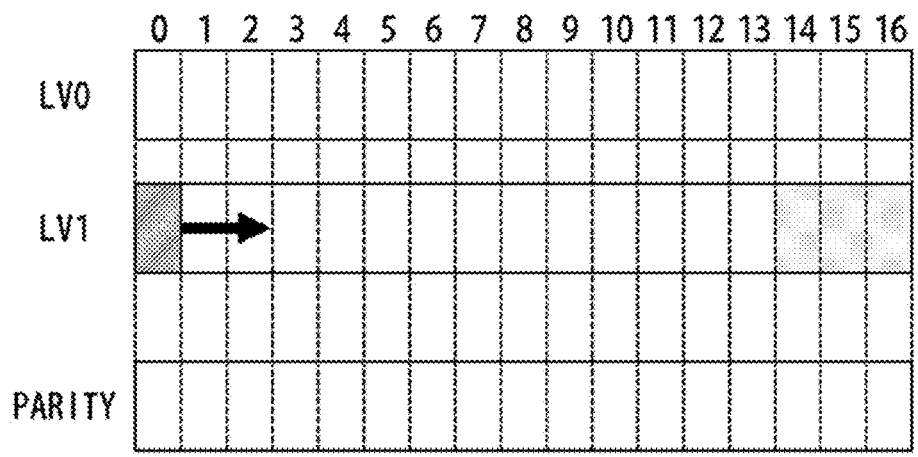
F I G. 23

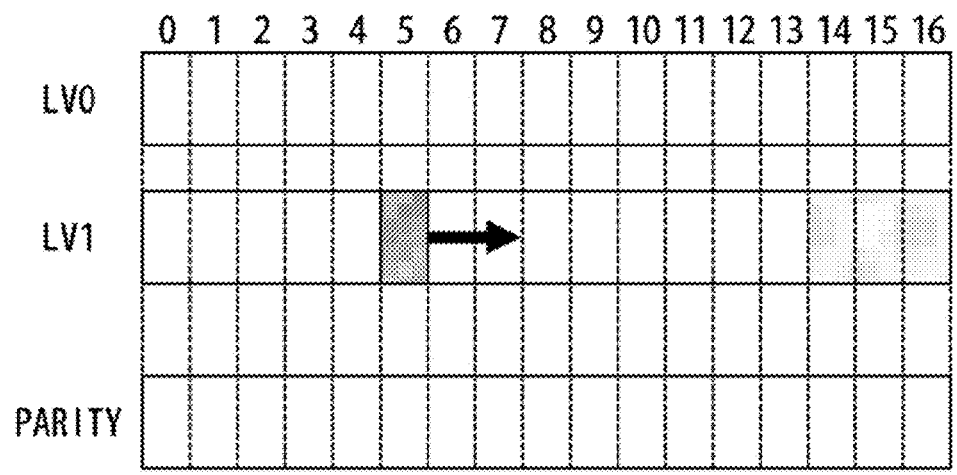
F I G. 26

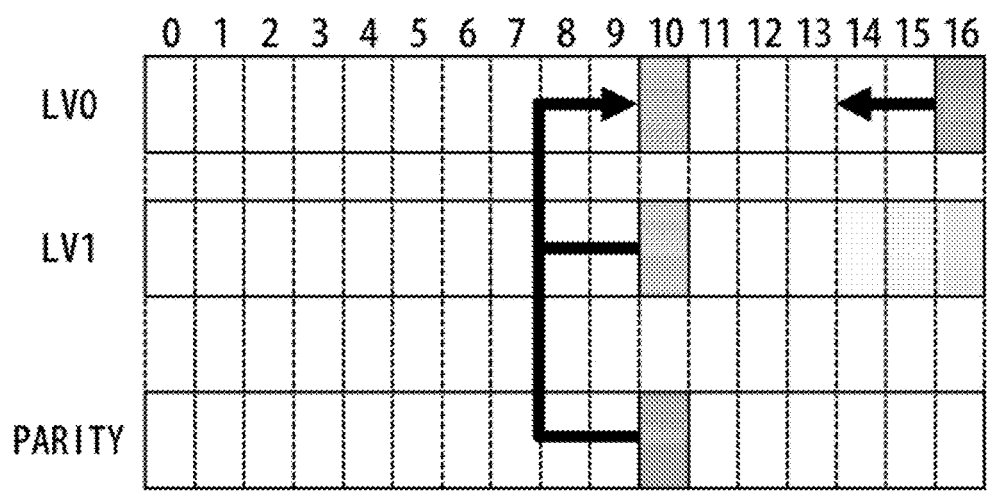
F I G. 29

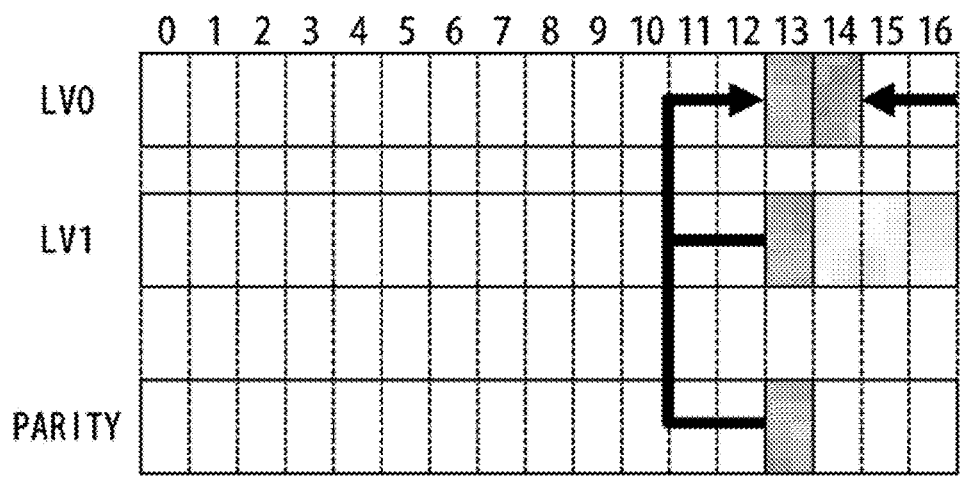
F I G. 30

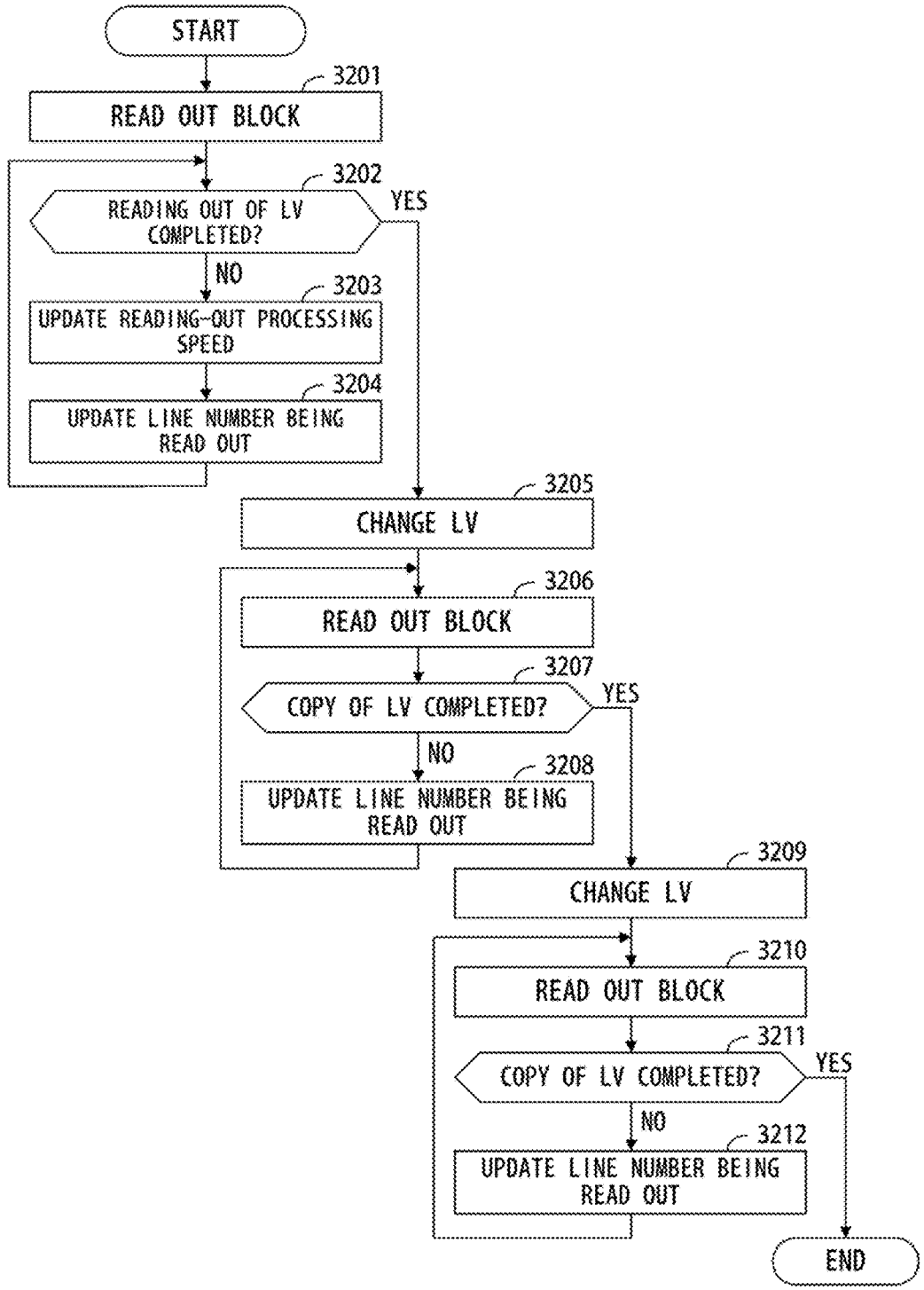
F I G. 32

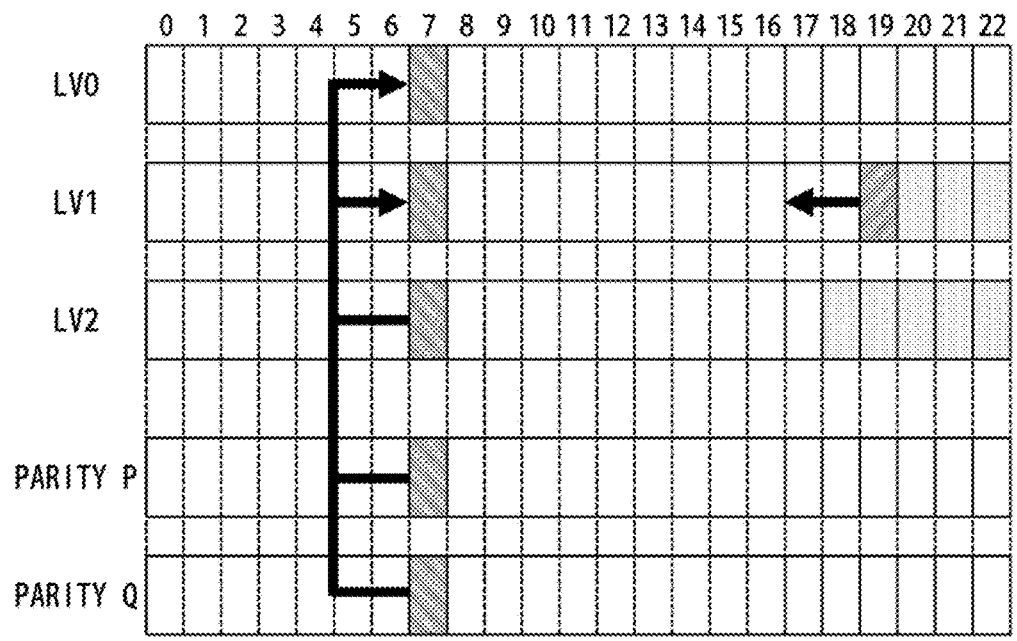
F I G. 3 5

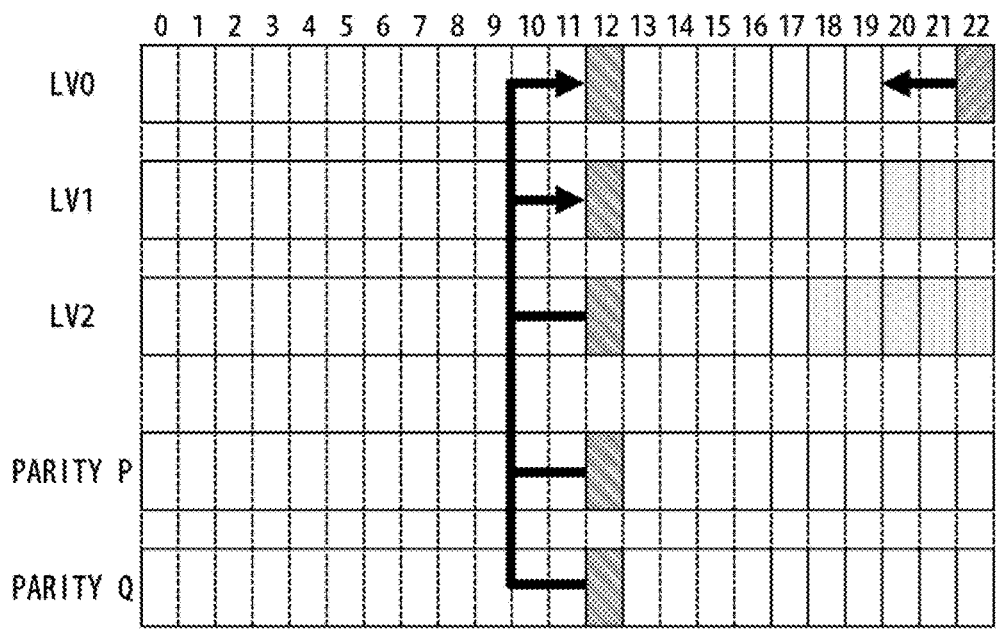
F I G. 37

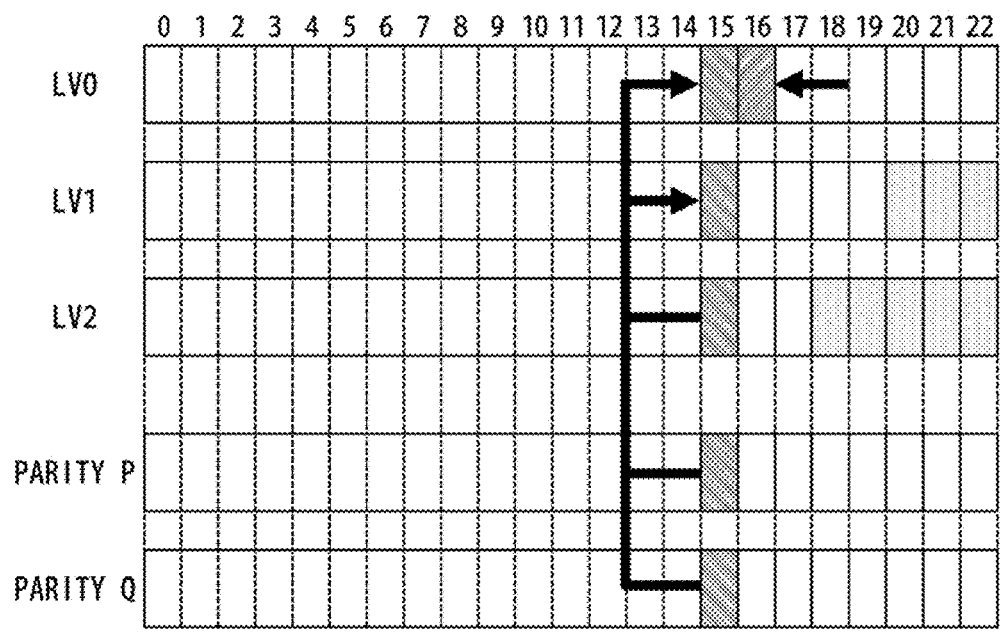
F I G. 38

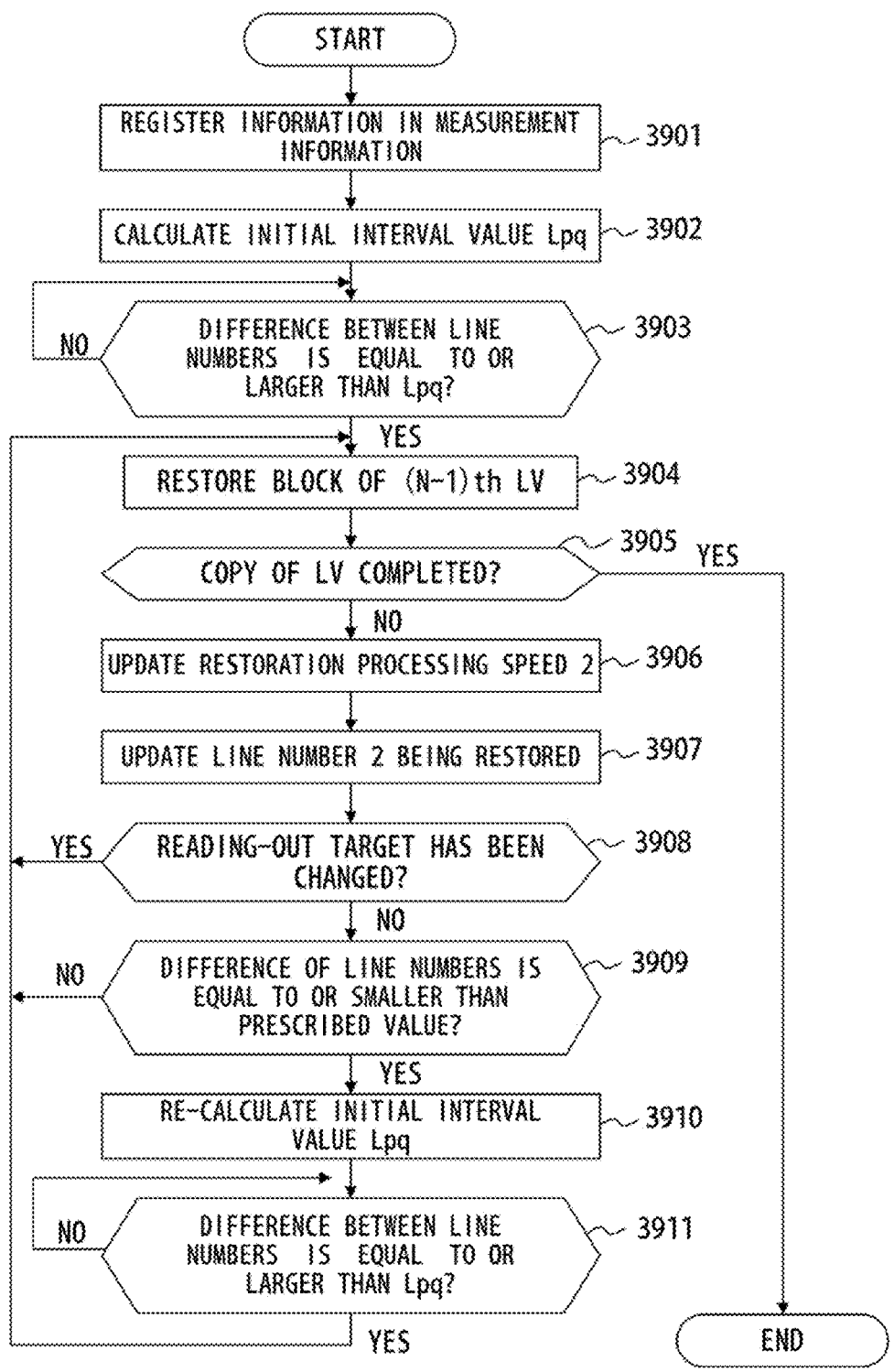
F I G. 39

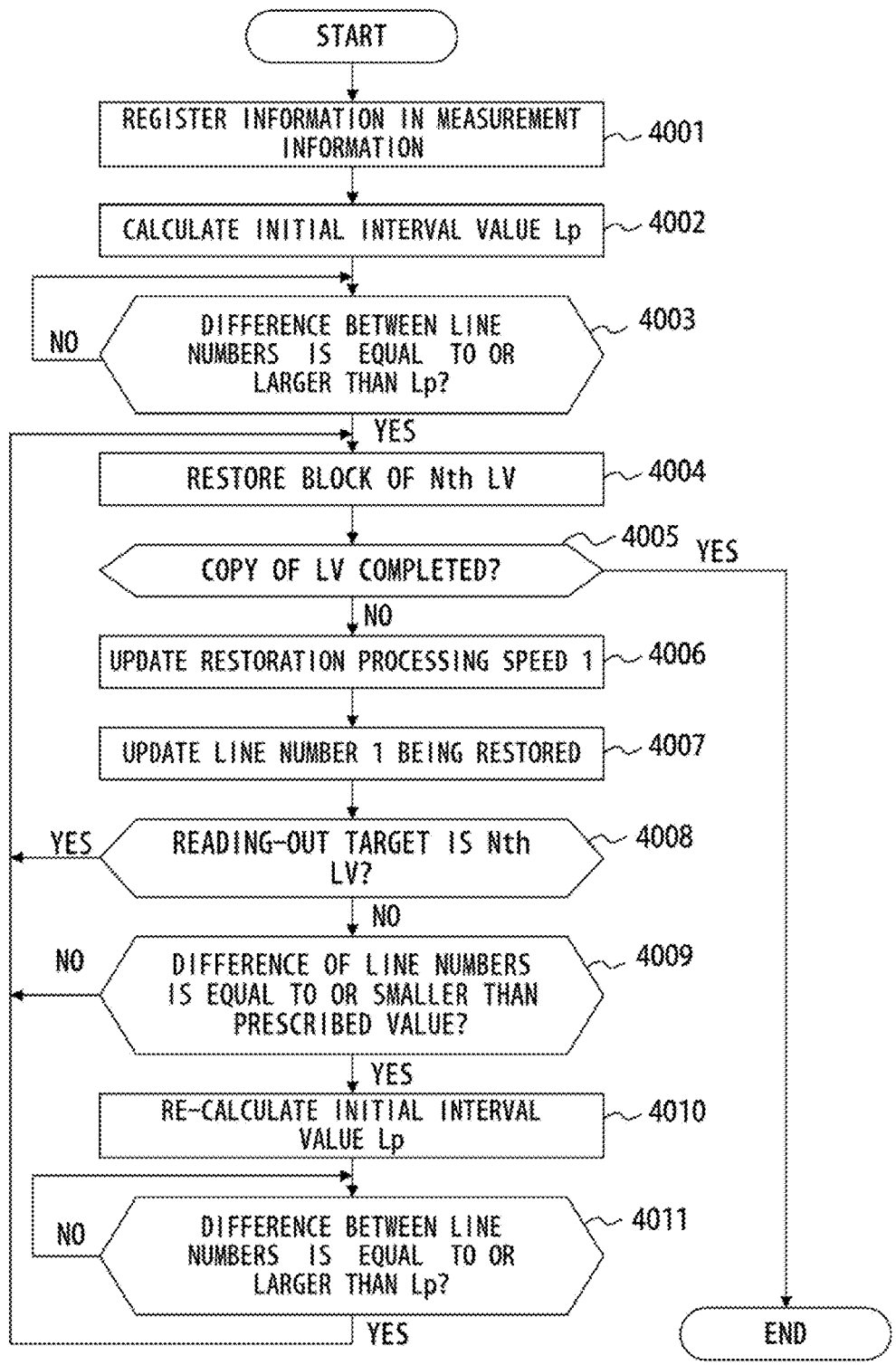
F I G. 40

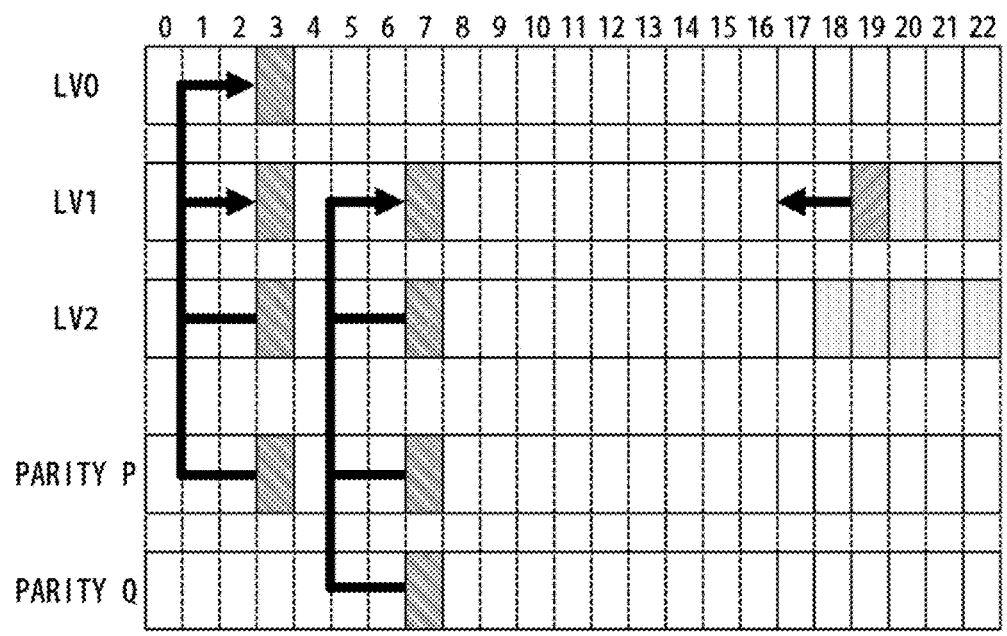
F I G. 42

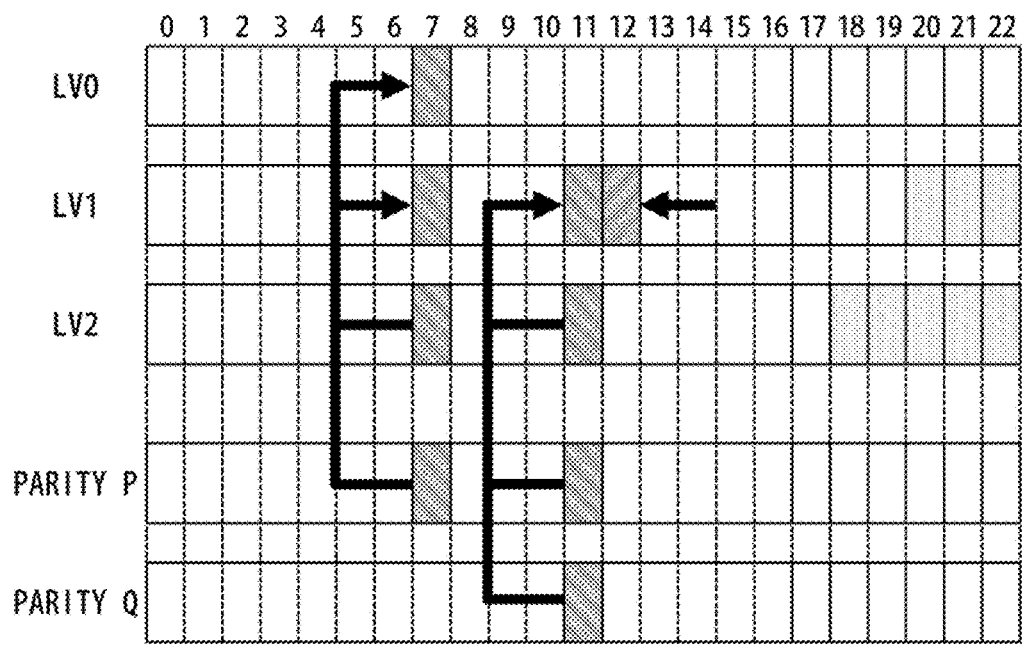
F I G. 43

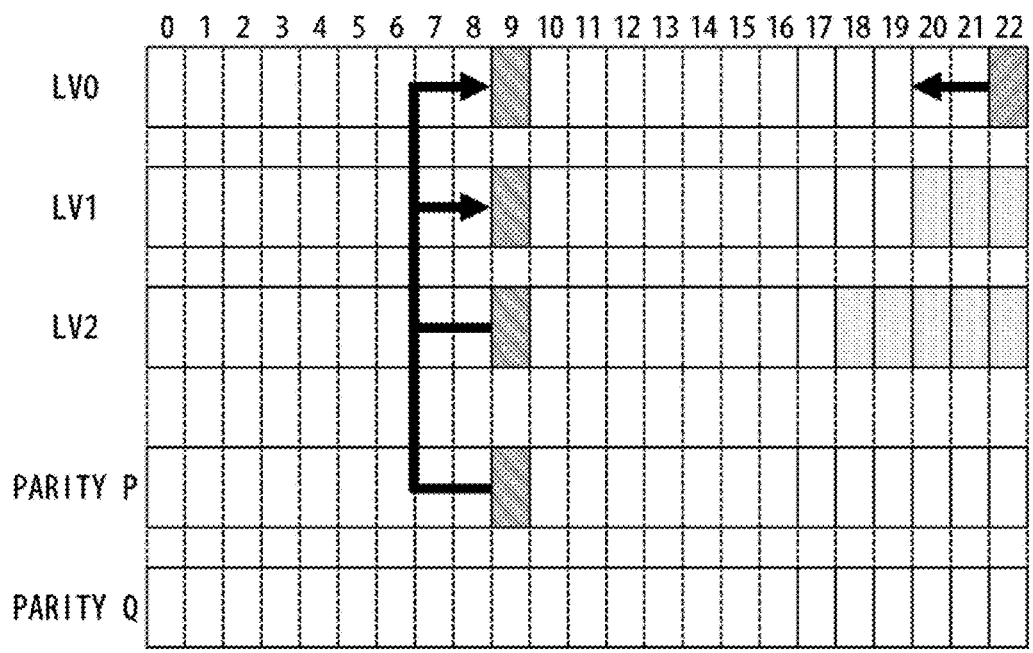
F I G. 4 4

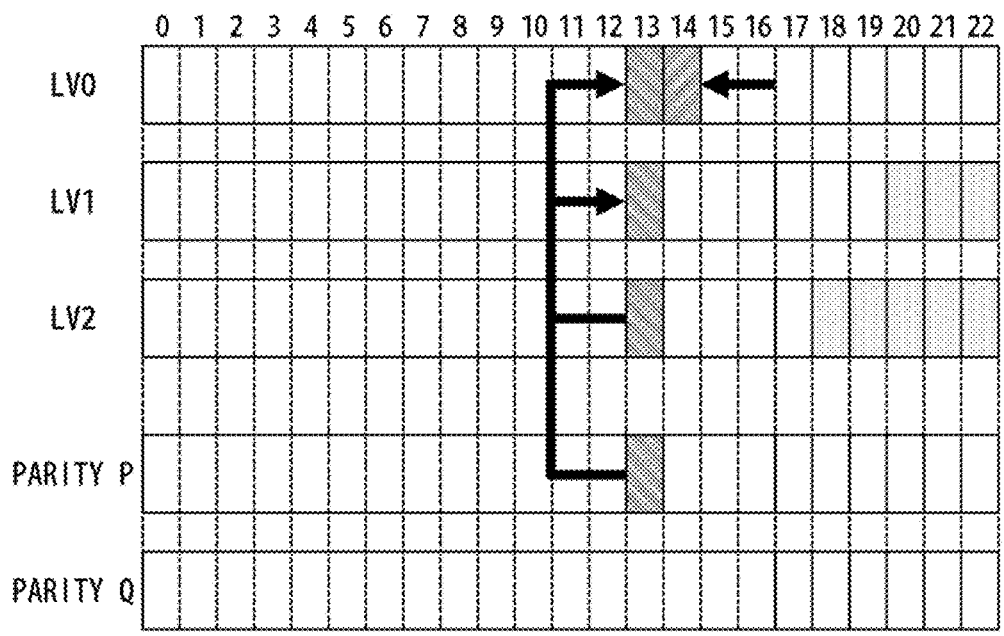
F I G. 45

STORAGE CONTROL APPARATUS AND STORAGE SYSTEM

CROSS-REFERENCE TO RELATED APPLICATION

This application is based upon and claims the benefit of priority of the prior Japanese Patent Application No. 2013-055071, filed on Mar. 18, 2013, the entire contents of which are incorporated herein by reference.

FIELD

The embodiments discussed herein relate to a storage control apparatus and a storage system.

BACKGROUND

A virtual tape apparatus is an apparatus that virtually carries out tape operations by assigning a virtual tape volume to, and storing data in, storage apparatus whose access speed is faster than that of a tape library apparatus. This virtual tape volume is called a logical volume. As a storage apparatus that stores data, for example, a disc array apparatus and the like is used, and to the back end of the virtual tape apparatus, a tape library apparatus is connected in many cases.

When there is no empty space in the storage apparatus, one of the logical volumes is written into the magnetic tape in the tape library apparatus, and is deleted from the storage apparatus. Then, when an access to the deleted logical volume occurs, the data of the logical volume is copied from the tape library apparatus to the storage apparatus. The operation of coping data of the logical volume from the tape library apparatus to the storage apparatus is called recall in some cases.

Meanwhile, a backup method to utilize redundant data for data restoration in a backup system in which data recorded in a disk apparatus is saved in a backup apparatus is also known (see Patent Document 1, for example).

In this backup method, data to be the backup target is divided into divided data of a specified size, and redundant data for data restoration is created for divided data that is less by one in number than the number of a plurality of data recording units that record data. Then, the corresponding divided data and redundant data are recorded respectively in different data recording units.

When restoring data, the corresponding divided data and redundant data are read in from the respective data recording units. When divided data could not be read in a normal manner from one of the data recording units, in the corresponding divided data and redundant data, the divided data that could not be read is crated using divided data and redundant data that could be read in a normal manner. Then, the data before the division is restored using the divided data.

Patent Document 1: Japanese Laid-open Patent Publication No. 2003-150325

SUMMARY

According to an aspect of the embodiments, a storage control apparatus includes a processor.

The processor generates a parity from dummy data attached to a first piece of data among a plurality of pieces of data and a piece of data other than the first piece of data among the plurality of pieces of data when writing the plurality of pieces of data into a first storage apparatus. Then, the processor stores the parity in a second storage apparatus.

The processor performs a reading-out process in parallel with a restoration process when reading out the plurality of pieces of data from the first storage apparatus and writing them into the second storage apparatus. The reading-out process is a process to read out the first piece of data from the first storage apparatus and to write it into the second storage apparatus, and the restoration process is a process to restore a second piece of data among the plurality of pieces of data by using the dummy data and the parity.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a configuration diagram of a storage system;

FIG. 3 is a configuration diagram of a storage control apparatus;

FIG. 4 is a diagram illustrating LV management information;

FIG. 5 is a diagram illustrating parity management information;

FIG. 6 is a diagram illustrating LVG information;

FIG. 7 is a diagram illustrating line information;

FIG. 8 is a diagram illustrating storage address information;

FIG. 9 is a diagram illustrating measurement information;

FIG. 10 is a flowchart of a writing-in process;

FIG. 13 is a flowchart of a restoration process based on the first storage control method;

FIG. 14 is a diagram illustrating a first state of a copy process based on the first storage control method;

FIG. 15 is a diagram illustrating a second state of a copy process based on the first storage control method;

FIG. 16 is a diagram illustrating a third state of a copy process based on the first storage control method;

FIG. 17 is a diagram illustrating a fourth state of a copy process based on the first storage control method;

FIG. 18 is a diagram illustrating a fifth state of a copy process based on the first storage control method;

FIG. 19 is a diagram illustrating a sixth state of a copy process based on the first storage control method;

FIG. 20 is a diagram illustrating a seventh state of a copy process based on the first storage control method;

FIG. 21 is a flowchart of a reading-out process based on a second storage control method in the case of a single parity;

FIG. 23 is a diagram illustrating a first state of a copy process based on the second storage control method in the case of a single parity;

FIG. 26 is a diagram illustrating a fourth state of a copy process based on the second storage control method in the case of a single parity;

FIG. 29 is a diagram illustrating a seventh state of a copy process based on the second storage control method in the case of a single parity;

FIG. 30 is a diagram illustrating a eighth state of a copy process based on the second storage control method in the case of a single parity;

FIG. 32 is a flowchart of a reading-out process based on the second storage method in the case of a double parity;

FIG. 35 is a diagram illustrating a second state of a first copy process based on the second storage control method in the case of a double parity;

FIG. 37 is a diagram illustrating a fourth state of a first copy process based on the second storage control method in the case of a double parity;

FIG. 38 is a diagram illustrating a fifth state of a first copy process based on the second storage control method in the case of a double parity;

FIG. 39 is a flowchart of a restoration process based on a second storage control method using parity P and parity Q;

FIG. 40 is a flowchart of a restoration process based on a second storage control method using only parity P;

FIG. 42 is a diagram illustrating a second state of a second copy process based on the second storage control method in the case of a double parity;

FIG. 43 is a diagram illustrating a third state of a second copy process based on the second storage control method in the case of a double parity;

FIG. 44 is a diagram illustrating a fourth state of a second copy process based on the second storage control method in the case of a double parity; and FIG. 45 is a diagram illustrating a fifth state of a second copy process based on the second storage control method in the case of a double parity.

DESCRIPTION OF EMBODIMENTS

The conventional virtual tape apparatus described above has problems as follows.

In the conventional virtual tape apparatus, when reading out data from the tape library apparatus and writing it into the storage apparatus according to a recall, in order for the conveyance mechanism to mount the magnetic tape on the tape drive, it takes a long time before starting the reading out of the data. Furthermore, when a reading error occurs while reading out data from the magnetic tape, it takes time to perform a reading-out retry. For this reason, there is a problem that it takes a long time to copy data from the tape library apparatus to the storage apparatus.

In addition, in the backup method that uses redundant data for data restoration, divided data are created using redundant data only when divided data could not be read in from the data recording unit in a normal manner. Therefore, the long time taken until the start of the reading-out of data is not improved.

Meanwhile such problems occur not only in the case of a tape library apparatus using a magnetic tape as recording medium but also in library apparatuses using other recording media.

Hereinafter, embodiments are explained in details with reference to the drawings.

Figure 1:
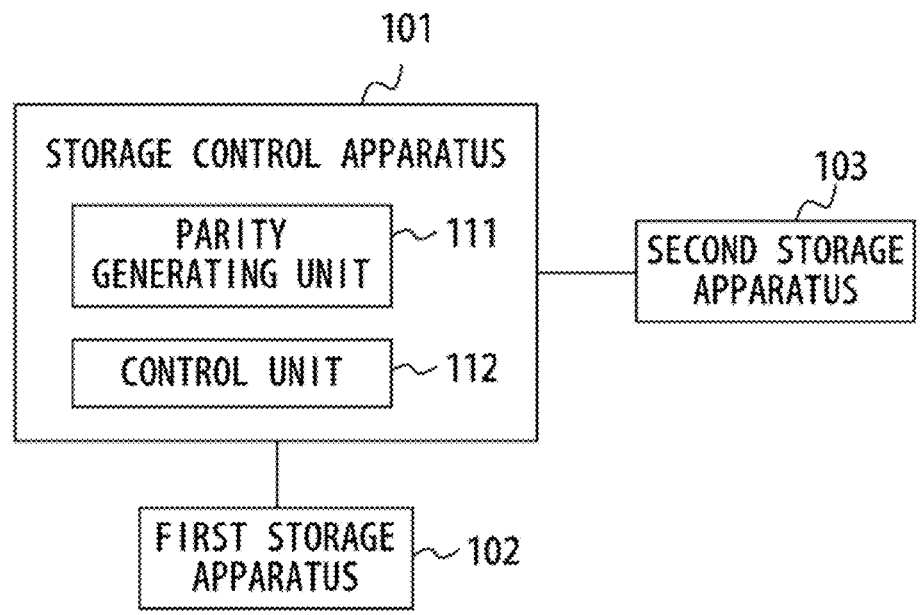
FIG. 1 is a functional configuration diagram of a storage control apparatus.

FIG. 1 illustrates a functional configuration example of a storage control apparatus of an embodiment. A storage control apparatus 101 in FIG. 1 includes a parity generating unit 111 and a control unit 112, and controls a first storage apparatus 102 and a second storage apparatus 103 by the first or second storage control method.

The access speed from the storage control apparatus 101 to the second storage apparatus 103 is faster than the access speed from the storage control apparatus 101 to the first storage apparatus 102. The first storage apparatus 102 is, for example, a library apparatus using a portable recording medium such as a magnetic tape or an optical disk and the like as a recording medium, and the second storage apparatus 103 is, for example, a magnetic disk apparatus, an optical disk apparatus, a magneto-optical disk apparatus, or a disk array apparatus.

In the first storage control method, the parity generating unit 111 generates a parity from dummy data attached to first data among a plurality of data and data other than the first data among those data when writing those data into the first storage apparatus 102. Then, the parity generating unit 111 stores the parity in the second storage apparatus 103.

The control unit 112 performs a reading-out process in parallel with a restoration process when reading the plurality of data from the first storage apparatus 102 and writing them into the second storage apparatus 103. The reading-out process is a process to readout the first data from the first storage apparatus 102 and to write it into the second storage apparatus 103, and the restoration process is a process to restore the second data among the plurality of data by using the dummy data and the parity.

According to the first storage control method, the time taken to copy data from the first storage apparatus 102 to the second storage apparatus 103 may be shortened.

In the second storage control method, the parity generating unit 111 generates a parity from a plurality of data, and stores the parity in the second storage apparatus 103 when writing those data into the first storage apparatus 102.

The control unit 112 performs a reading-out process in parallel with a restoration process when reading the plurality of data from the first storage apparatus 102 and writing them into the second storage apparatus 103. The reading-out process is a process to read out the first data among the plurality of data from the first storage apparatus 102 in units of partial data and to write it into the second storage apparatus 103, and the restoration process is a process to restore the first data in units of partial data by using the second data and the parity, in the opposite direction of the direction in which the reading-out process is performed for the first data.

According to the second storage control method, the time taken to copy data from the first storage apparatus 102 to the second storage apparatus 103 may be shortened.

FIG. 2 illustrates a configuration example of a storage system including the storage control apparatus 101 in FIG. 1. A storage system 201 in FIG. 2 includes the storage control apparatus 101, a tape library apparatus 211 and a disk array apparatus 212. The tape library apparatus 211 and the disk array apparatus 212 correspond to the first storage apparatus 102 and the second storage apparatus 103 in FIG. 1, respectively. To the storage control apparatus 101, a host apparatus 202 is connected.

The host apparatus 202 accesses data stored in the storage system 201, by transmitting an access request to the storage control apparatus 101. The storage control apparatus 101 controls the data forwarding operation between the host apparatus 202 and the disk array apparatus 212, and the data forwarding operation between the disk array apparatus 212 and the tape library apparatus 211

The storage control apparatus 101 and the disk array apparatus 212 operate as a virtual tape apparatus, and the tape library apparatus 211 operates as a backend library apparatus. The host apparatus 202 is capable of virtually access to the tape library apparatus 211 by performing data transmission/reception with the virtual tape apparatus.

The tape library apparatus 211 includes a storing unit that accommodates a plurality of magnetic tapes, one or more tape drives, a conveyance mechanism that conveys the magnetic tape, and a control unit that controls the tape drives and the conveyance mechanism.

It is also possible to use another library apparatus as the first storage apparatus 102, and as the recording medium of the library apparatus, other than the magnetic tape, an optical disk, a magneto-optical disk, a magnetic disk and the like may be used.

FIG. 3 illustrates a configuration example of the storage control apparatus 101. The storage control apparatus 101 in FIG. 3 is an information processing apparatus (computer), and includes a Central Processing Unit (CPU) 301, a memory 302, and an auxiliary storage device 303. The storage control apparatus 101 further includes a tape interface 304, an input interface 305, a medium driving device 306, a host interface 307, and a disk interface 308. These constituent elements are connected to each other by a bus 309.

The memory 302 is, for example, a semiconductor memory such as a Read Only Memory (ROM), a Random Access Memory (RAM), a flash memory and the like, and stores the program and data used for control.

The CPU 301 (processor) operates as the parity generating unit 111 and the control unit 112 in FIG. 1 by, for example, executing a program using the memory 302.

The auxiliary storage apparatus 303 is, for example, a magnetic disk apparatus, an optical disk apparatus, a magneto-optical disk apparatus and the like. The auxiliary storage apparatus 303 may be a hard disk drive. The storage control apparatus 101 is able to store the program and data in the auxiliary storage apparatus 303 and to load and use them on the memory 302.

The tape interface 304 is a communication interface that transmits/receives data to/from the tape library apparatus 211. The host interface 307 is a communication interface that transmits/receives data to/from the host apparatus 202. The disk interface 308 is a communication interface that transmits/receives data to/from the disk array apparatus 212.

To the input interface 305, an input apparatus 311 is connected. The input apparatus 311 is, for example, a keyboard, a pointing device and the like, and is used for inputting an instruction and information from a user or an operator. The input apparatus 311 may also be included in the storage control apparatus 101.

The medium driving apparatus 306 drives a portable recording medium 312, and accesses its recording content. The portable recording medium 312 is a memory device, a flexible disk, an optical disk, a magneto-optical disk and the like. The portable recording medium 312 may be a Compact Disk Read Only Memory (CD-ROM), a Digital Versatile Disk (DVD), or a Universal Serial Bus (USB) memory. The user or the operator is able to store the program and data in the portable recording medium 312, and to load and use them on the memory 302.

As described above, as the computer-readable recording medium that stores the program and data used for control, a physical (non-transitory) recording medium such as the memory 302, the auxiliary storage apparatus 303, and the portable recording medium 312 is used.

The storage control apparatus 101 may further include a network connection apparatus. The network connection apparatus is a communication interface that is connected to a communication network such as Local Area Network (LAN), Internet and the like and performs data conversion associated with communication. The storage control apparatus 101 is able to receive the program and data from an external apparatus via the network connection apparatus and to load and use them on the memory 302.

Meanwhile, the storage control apparatus 101 does not need to include all the constituent elements in FIG. 3, and it is also possible to omit a part of the constituent elements according to the purpose and conditions. For example, when there is no need for the user or the operator to input any instruction to the storage control apparatus 101, the input interface 305 and the input apparatus 311 may be omitted.

The host apparatus 202 in FIG. 2 may also be implemented as an information processing apparatus as in FIG. 3.

The data forwarding to the tape library apparatus 211 from the storage control apparatus 101 is executed in units of the logical volume group (LVG) consisting of one or more logical volumes (LV). The auxiliary storage apparatus 303 stores, for example, the LV management information and parity management information as control data, and the memory 302 stores, for example, the measurement information as control data. The LV management information and parity management information may also be stored in the disk array apparatus 212.

The LV management information is information related to each logical volume stored in the tape library apparatus 211, and the parity management information is information related to parity of each logical volume group stored in the disk array apparatus 212. Meanwhile, the measurement information is information updated based on information measured during the operation of the storage system 201.

The parity generating unit 111 of the storage control apparatus 101 generates parity by using data of each logical volume belonging to a logical volume group when forwarding the logical volume group to the tape library apparatus 211. Then the parity generating unit 111 stores the generated parity in the disk array apparatus 212.

The control unit 112 makes a request to the tape library apparatus 211 for reading-out of data, according to an access request from the host apparatus 202. Next, the control unit 112 writes the data readout from the tape library apparatus 211 into the disk array apparatus 212. Then, the control unit 112 reads out data from the disk array apparatus 212, and transmits it to the host apparatus 202.

At this time, the control unit 112 does not read out a part of data among data of a plurality of logical volumes belonging to one logical volume group from the tape library apparatus 211, and restores the part of data by using parity stored in the disk array apparatus 212.

The time taken to read out data from the tape library apparatus 211 is considered as longer compared with the time taken to readout data from the disk array apparatus 212. However, by restoring data using parity without reading a part of data, the amount of data that is actually read out is reduced, and the time taken to copy data from the tape library apparatus 211 to the disk array apparatus 212 is shortened.

The control unit 112 restores a part of data in a logical volume group by using data that has already been read out from the tape library apparatus 211, among the data in the logical volume group, and parity stored in the disk array apparatus 212.

FIG. 4 illustrates an example of the LV management information. The LV management information in FIG. 4 holds information that indicates at which position of which magnetic tape the logical volume defined on the storage system is stored. The LV management information is provided for each logical volume, and includes "LV number", "storage destination tape number", "LV size", and "beginning address".

The "LV number" is identification information for identifying the corresponding logical volume. The "storage destination tape number" is identification information for identifying the magnetic tape in which the corresponding logical volume is stored. The "LV size" is information indicating the size of the corresponding logical volume. The "beginning address" is information indicating the beginning address of the area in which the corresponding logical volume is stored.

When the logical volume being the access target does not exist in the disk array apparatus 212, the control unit 112 refers to the LV management information, and identifies the magnetic tape in which the logical volume is stored. Then, the control unit 112 reads out data of the logical volume from the identified magnetic tape, and writes it into the disk array apparatus 212.

FIG. 5 illustrates an example of the parity management information. The parity management information in FIG. 5 includes "parity size" as information that is common to a plurality of logical volume groups, and includes LVG information for each logical volume group. The "parity size" indicates the size per one block of parity, and matches the block size being the size per one block data.

FIG. 6 illustrates an example of each piece of the LVG information. The LVG information in FIG. 6 includes "LVG number", "number of LVs", "LV list", "parity type", "LV size 1", "LV size 2", "LV size 3", "LV size 4", and "number of lines".

The "LVG number" is identification information for identifying the corresponding logical volume group. The "number of LVs" indicates the number of logical volumes belonging to the corresponding logical volume group. The "LV list" is a list of LV numbers of the logical volumes belonging to the corresponding logical volume group. Meanwhile, the user may set, via the host apparatus 202, to which logical volume group a logical volume belongs, and in the "number of LVs" and the "LV list", information according to the setting operation of the user is registered.

The "parity type" indicates the type of parity generated when writing the corresponding logical volume group into the magnetic tape in the tape library apparatus 211. When generating only one type of parity (parity P), "single parity" is registered as the "parity type", and when two types of parity (parity P and parity Q) are generated, "double parity" is registered as the "parity type". Meanwhile as for the "parity type", for example, information according to the setting operation by the user is registered as well.

The "LV size 1" indicates the size of the largest logical volume among logical volumes belonging to the corresponding logical volume group. The "LV size 2" indicates the size of the second largest logical volume among logical volumes belonging to the corresponding logical volume group. The "LV size 3" indicates the size of the third largest logical volume among logical volumes belonging to the corresponding logical volume group. The "LV size 4" indicates the size of the smallest logical volume among logical volumes belonging to the corresponding logical volume group.

The "number of lines" indicates the number of blocks included in the largest logical volume among logical volumes belonging to the corresponding logical volume group. The "number of lines" may be obtained by dividing the "LV size 1" by the "parity size" (block size).

The "LV size 1", "LV size 2", "LV size 3", "LV size 4", and the "number of lines" are registered automatically by the control unit 112 when a logical volume to belong to the logical volume group is set, for example. Meanwhile, the "LV size 3" is registered when the "parity type" is "double parity".

Furthermore, the LVG information includes line information for each line. The number of the pieces of the line information matches the "number of lines".

FIG. 7 illustrates an example of each piece of the line information in FIG. 6. The line information in FIG. 7 includes the "line number", the "number of LVs" and "LV list".

The "line number" is identification information for identifying the corresponding line. The "number of LVs" indicates the number in which the number of parities is added to the number of logical volumes belonging to the corresponding logical volume group.

To the parity generated for a logical volume group, one or more logical volumes belonging to a floating area are assigned. For example, in the case of a single parity, one logical volume belonging to the floating volume is assigned, and in the case of a double parity, two logical volumes belonging to the floating area are assigned. Therefore, the "number of LVs" in the line information is "number of LVs" of the LVG information plus 1 in the case of a single parity, and is "number of LVs" of the LVG information plus 2 in the case of a double parity.

The "LV list" is a list consisting of the LV numbers of the logical volumes belonging to the corresponding logical volume group and the LV numbers of the logical volumes assigned to the parities.

The line information further includes the storage address information for each logical volume. The number of pieces of storage address information matches the "number of LVs" of the line information.

FIG. 8 illustrates an example of each piece of the storage address information in FIG. 7. The storage address information in FIG. 8 includes the "LV number", "beginning address", and "ending address".

The "LV number" is identification information for identifying the corresponding logical volume, The "beginning address" indicates the beginning address of the storage area in the disk array apparatus 212 in which partial data or partial parity of one block belonging to the corresponding line among the data or parity of the corresponding logical volume is stored. The "ending address" indicates the ending address of the storage area.

FIG. 9 illustrates an example of the measurement information. The measurement information is generated by the control unit 112 and referred to when data is read out from the tape library apparatus 211 and written into the disk array apparatus 21. The measurement information in FIG. 9 includes the "LVG number", "line number being read out", "line number 1 being restored", "line number 2 being restored", "initial interval value 1", "initial interval value 2", "reading-out processing speed", "restoration processing speed 1", and "restoration processing speed 2".

The "LVG number" is identification information for identifying the logical volume group being the processing target. When executing the copy process to read out data of one logical volume group from the tape library apparatus 211 and writing it into the disk array apparatus 212, the control unit 112 generates measurement information including the "LVG number" of the logical volume group in the memory 302. After that, until the entire logical volume group is written into the disk array apparatus 212, the information in the generated measurement information other than the "LVG number" is updated as needed by the control unit 112.

The "line number being read out" is a line number that indicates data of which line is being read out, in the logical volume being read out from the magnetic tape. The "line number 1 being restored" is a line number that indicates data of which line is being restored, in the logical volume being restored using the parity. The "line number 2 being restored" is information added in the case in which data of two logical volumes are restored in parallel, and is a line number that indicates data of which line is being restored, in the second logical volume being restored using the parity.

The "initial interval value 1" indicates the number of lines used for determining the timing to restore data by using the parity. The control unit 112 performs control so that the interval between the line being restored in a logical volume and the line being read out or restored in another logical volume becomes equal to or larger than the number of lines indicated by the "initial interval value 1".

The "initial interval value 2" is information added in the case in which data of two logical volumes are restored in parallel. The "initial interval value 2" indicates the number of lines used for determining the timing to restore data of the second logical volume of the two logical volumes by using the parity. The "initial interval value 1" and the "initial interval value 2" are calculated by the control unit 112.

The "reading-out processing speed" is the measurement result of the reading-out processing speed of the logical volume from the magnetic tape by the control unit 112, and indicates the size of data that is read out per unit time. The "restoration processing speed 1" is the measurement result of the restoration processing speed of the logical volume using the parity by the control unit 112, and indicates the size of data that is restored per unit time. The "restoration processing speed 2" is information added in the case in which data of two logical volumes are restored in parallel, and indicates the measurement result of the restoration processing speed of the second volume in the two logical volumes.

FIG. 10 is a flowchart illustrating an example of a writing-in process to write data of the disk array apparatus 212 into the tape library apparatus 211 in the first and second storage control methods.

First, the control unit 112 refers to the LVG information corresponding to the LVG number of the logical volume group being the writing-in target in the parity management information in FIG. 5, and reads out the respective LV numbers included in the LV list (step 1001).

Next, the control unit 112 refers to the LV management information in FIG. 4 and reads out the LV sizes corresponding to the respective LV numbers (step 1002), and checks whether or not all the LV sizes are the same (step 1003).

When all the LV sizes are not the same (step 1003, NO), the control unit 112 attaches dummy data to the logical volumes other than the logical volume of the largest size, in the logical volumes belonging to the logical volume group (step 1004).

The dummy data is distinguishable data from data of each logical volume, and has a prescribed value such as "0", for example. By adding dummy data of the size of the difference between the size of the logical volume and the largest size to the logical volumes other than the logical volume of the largest size, the sizes of the respective logical volumes may be aligned with the largest size.

Meanwhile, there is no need to secure the storage area of dummy data corresponding to the sum of the sizes of the differences for a plurality of logical volumes, and only the storage area of the size of one block may be secured, for example. Then, dummy data of one block may be stored in the storage area, and as the storage address information of dummy data added to the respective logical volumes, the address of the storage area may be registered. In this case, for the storage address information of dummy data in the storage address information in FIG. 7, as the beginning address and the ending address in FIG. 8, the beginning address and the ending address of the storage area of the dummy data are registered.

In the explanation below, when dummy data is attached to a logical volume, the entire data including the attached dummy data may be referred to as data of the logical volume. However, since dummy data is data attached temporarily for parity generation, it does not need to be written into the tape library apparatus 211.

Next, the parity generating unit 111 reads out data of the blocks of the respective logical volumes from the disk array apparatus 213 in order of line number, and generates the parity by using those data (step 1005). When the "parity type" is a single parity, parity P is generated, and when the "parity type" is a double parity, parity P and parity Q are generated.

At this time, the parity generating unit 111 refers to the line information in FIG. 7 corresponding to the line number, and reads out the LV number of the respective volumes included in the LV list. Then, the parity generating unit 111 refers to the storage address information in FIG. 8 corresponding to the LV number, and reads out data of the corresponding block from the storage area of the disk array apparatus 212 indicated by the beginning address and the ending address.

In the logical volumes other than the logical volume of the largest size, there is a case in which data of the read-out block is not dummy data, and there is also a case in which it is dummy data. By attaching dummy data to the logical volumes other than the logical volume of the largest size, it becomes possible to generate the parity even in a case in which the sizes of the respective logical volumes are not equal.

The parity generating unit 111 reads out the LV number of the logical volume assigned to the parity, included in the LV list of the line information in FIG. 7. Then, the parity generating unit 111 refers to the storage address information in FIG. 8 corresponding to the LV number, and writes the generated parity into the storage area of the disk array apparatus 212 indicated by the beginning address and the ending address.

Next, the control unit 112 reads out the data of the respective logical volumes from the disk array apparatus 212 and write it into the tape library apparatus 211 (step 1006).

At this time, the control unit 112 refers to the line information in FIG. 7 corresponding to each line number, and reads out the LV number of each logical volume included in the LV list. Next, the control unit 112 refers to the storage address information in FIG. 8 corresponding to the LV number, and reads out data of the corresponding block from the storage area of the disk array apparatus 212 indicated by the beginning address and the ending address. Then, the control unit 112 forwards the read-out data to the tape library apparatus 211.

The tape library apparatus 211 selects, for example, an unused magnetic tape sequentially, and writes data received from the control unit 112 into the selected magnetic tape. The control unit 112 receives the tape number of the magnetic tape in which data of the respective logical volumes is written, and the writing-in position in the magnetic tape, from the tape library apparatus 211. Then, the control unit 112 registers the received tape number and the writing-in position in the LV management information in FIG. 4 corresponding to the LV number of each logical volume, as the storage destination tape number and the beginning address.

Meanwhile, when all the LV sizes are the same (step 1003, YES), the parity generating unit 111 and the control unit 112 performs the process after step 1005 without attaching dummy data.

Next, referring to FIG. 11 through FIG. 20, an embodiment of the first storage control method is explained.

Figure 11:
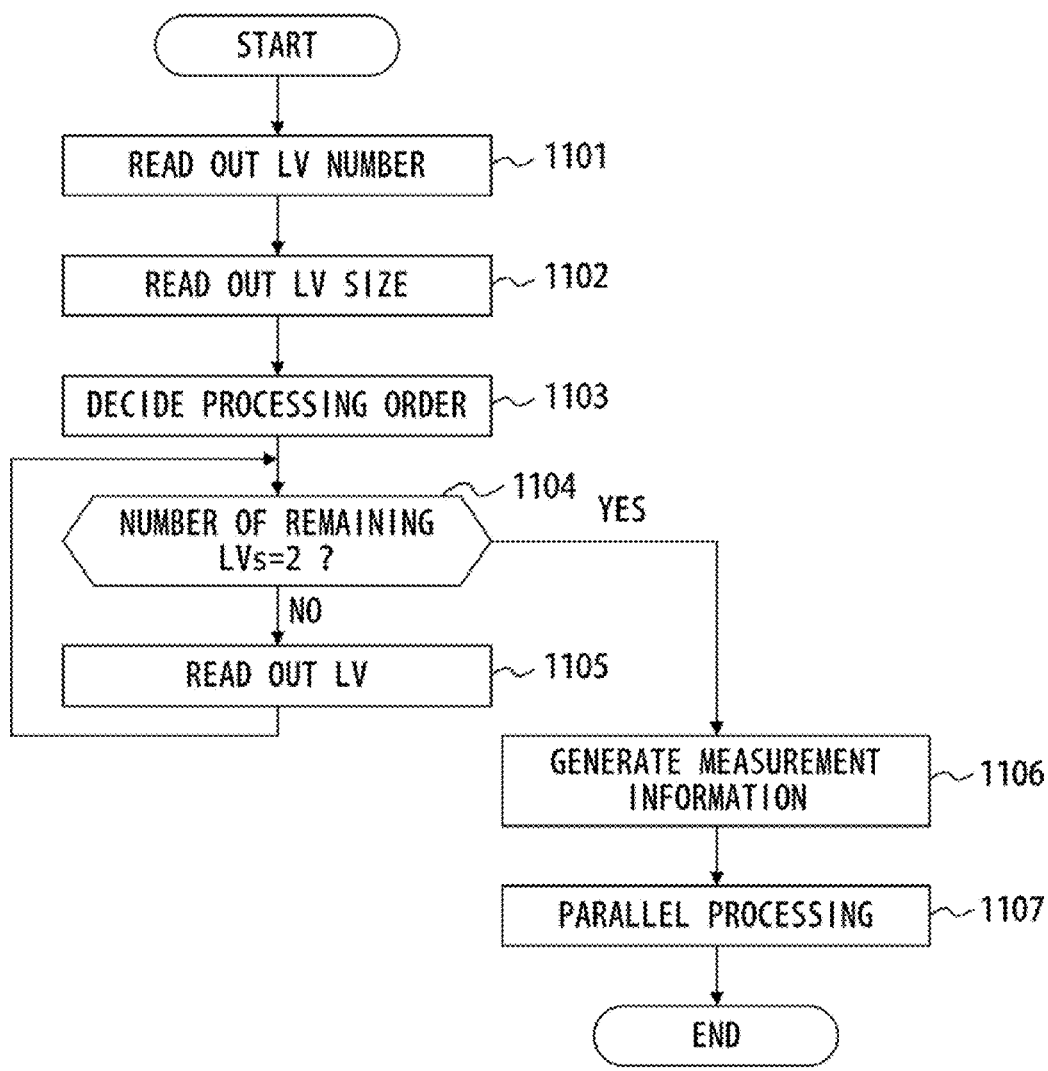
FIG. 11 is a flowchart of a copy process in the case of a single parity.

FIG. 11 is a flowchart illustrating an example of a copy process in which, in the first storage control method, data of one logical volume group is read out from the tape library apparatus 211 and written into the disk array apparatus 212. In this example, the "parity type" is "single parity".

In this case, in the LVG information in FIG. 6, "LV size 1", "LV size 2", and "LV size 3" may be omitted, and in the measurement information in FIG. 9, the "line number 2 being restored", "initial interval value 2", and "restoration processing speed 2" may be omitted.

First, the control unit 112 refers to the LVG information corresponding to the LVG number of the logical volume group being the copy target in the parity management information in FIG. 5, and reads out the respective LV numbers included in the LV list (step 1101).

Next, the control unit 112 refers to the LV management information in FIG. 4 and reads out the LV sizes corresponding to the respective LV numbers (step 1102), and decides the processing order of the logical volumes based on the LV sizes (step 1103).

At this time, the control unit 112 decides, for example, in the N pieces (N is an integer being 2 or larger) of logical volumes belonging to the logical volume group being the copy target, the processing order of the logical volume of the largest size as the Nth (last). Meanwhile, the control unit 112 decides the processing order of the logical volume of the smallest size as the (N−1)th. Then, when N is an integer being 3 or larger, the control unit 112 decides, for example, the processing order of the remaining (N−2) pieces of logical volumes as the first through the (N−2)th in ascending order of the size.

Next, the control unit 112 checks whether or not the number of the remaining logical volumes for which reading-out has not been completed is 2 (step 1104). When the number of the remaining volumes is 3 or more (step 1104, NO), the control unit 112 selects the logical volume whose reading-out order is the top (step 1105). Then, the control unit 112 reads out data of the selected logical volume from the tape library apparatus 211, and writes it into the disk array apparatus 212.

At this time, the control unit 112 refers to the LV management information in FIG. 4 corresponding to the LV number of the selected logical volume, and reads out the data in units of block from the magnetic tape indicated by the storage destination tape number. Next, the control unit 112 refers to the storage address information in FIG. 8 corresponding to the LV number, in the line information in FIG. 7 corresponding to the line number of each block. Then, the control unit 112 writes the read-out data into the storage area of the disk array apparatus 212 indicated by the beginning address and the ending address, and repeats the processes in and after step 1104.

Meanwhile, when the number of the remaining logical volumes is 2 (step 1104, YES), the control unit 112 generates measurement information corresponding to the LVG number of the logical volume group being the copy target, in the memory 302 (step 1106).

At this time, the control unit 112 registers the top line number of the logical volume group, and registers a prescribed initial value in the "reading-out processing speed".

Then, the control unit 112 executes a parallel processing in which the reading-out process and the restoration process are performed in parallel (step 1107).

Figure 12:
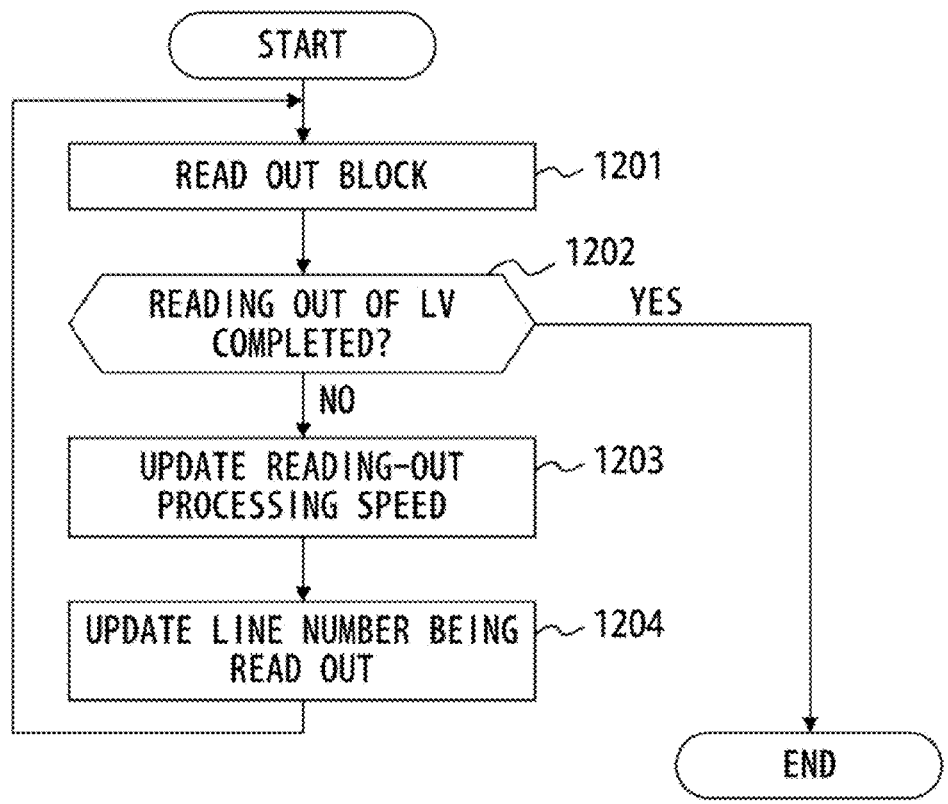
FIG. 12 is a flowchart of a reading-out process based on a first storage control method.

FIG. 12 is a flowchart illustrating an example of the reading-out process in step 1107 in FIG. 11. The target of the reading-out process in FIG. 12 is the logical volume whose processing order is the (N−1) th (the logical volume of the smallest size).

First, the control unit 112 selects, in the blocks of the logical volume being the target of the reading-out process, the block corresponding to the "line number being read out" in the measurement information (step 1201). Then, the control unit 112 reads out data of the selected block from the tape library apparatus 211, and writes it into the disk array apparatus 212.

At this time, the control unit 112 refers to the LV management information in FIG. 4 corresponding to the LV number of the logical volume being the target of the reading-out process, and reads of data of the selected block from the magnetic tape indicated by the storage destination tape number. Next, the control unit 112 refers to the storage address information in FIG. 8 corresponding to the LV number in the line information in FIG. 7 corresponding to the line number of the selected block. Then, the control unit 112 writes the read-out data into the storage area of the disk array apparatus 212 indicated by the beginning address and the ending address.

Next, the control unit 112 checks whether or not the reading-out of all the blocks included in the logical volume has been completed (step 1202). When the reading-out of all the blocks has not been completed (step 1202, NO), the control unit 112 calculates the reading-out processing speed from the top block to the block that was last read-out (step 1203). Then, the control unit 112 updates the "reading-out processing speed" in the measurement information in FIG. 9 with the calculated reading-out processing speed.

Meanwhile, the control unit 112 may calculate the reading-out processing speed from the top block of the first logical volume to the block that was last read out before the (N−1)th logical volume, instead of the reading-out processing speed of the (N−1)th logical volume.

Next, the control unit 112 increments the "line number being read out" in the measurement information by 1 (step 1204), and repeats the process after step 1201. Then, when the reading-out of all the blocks is completed (step 1202, YES), the reading-out process is terminated.

FIG. 13 is a flowchart illustrating an example of the restoration process in step 1107 in FIG. 11. The target of the restoration process in FIG. 13 is the logical volume whose processing order is the Nth (the logical volume of the largest size), and the restoration process is executed in parallel with the reading-out process in FIG. 12.

FIG. 14 through FIG. 20 illustrate an example of a copy process based on the first storage control method. In this example, there are two logical volumes LV0 and LV1 belonging to the logical volume group being the copy target, and the "parity type" is "single parity".

In the first state illustrated in FIG. 14, the LV0 corresponds to the logical volume of the largest size, and its size corresponds to 17 blocks. Meanwhile, the LV1 corresponds to the logical volume of the smallest size, and its size corresponds to 11 blocks. Therefore, the storage area of each of the LV0 and the LV1 in the disk array apparatus 212 is the area of 17 blocks corresponding to the line number 0 through line number 16. In this case, the LV0 is the logical volume being the target of the restoration process, and the LV1 is the logical volume being the target of the reading-out process.

In the storage area of the LV1, the area of the 11 blocks corresponding to the line number 0 through line number 10, data read out from the tape library apparatus 211 is stored. Meanwhile, in the area of the 6 blocks corresponding to the line number 11 through line number 16, dummy data is stored. Meanwhile, in the storage area of the LV0, data restored using the data of the LV1 and the parity is stored.

First, the control unit 112 registers, in the blocks of the logical volume being the target of the reading-out process in which dummy data is stored, the line number of the top block in the "line number 1 being restored" in the measurement information in FIG. 9 (step 1301). Then, a prescribed initial value is registered in the "restoration processing speed 1".

Next, the control unit 112 selects, in the blocks of the logical volume being the target of the restoration process, the block corresponding to the "line number 1 being restored" (step 1303). Then, the control unit 112 reads out data of the blocks of other logical volumes and the block of the parity corresponding to the same line number from the disk array apparatus 212. The control unit 112 restores the data of the selected block by using the read-out data of the respective blocks, and writes the restored data of the block into the disk array apparatus 212.

At this time, the control unit 112 refers to the line information in FIG. 7 corresponding to the "line number 1 being restored" and reads out the LV number of each logical volume included in the LV list. Then, the control unit 112 refers to the storage address information in FIG. 8 corresponding to the LV number, and reads out data of the corresponding block from the storage area of the disk array apparatus 212 indicated by the beginning address and the ending address.

Among the other logical volumes corresponding to the "line number 1 being restored", in the logical volumes other than the target of the reading-out process, data of the block read out may be the data that is read out from the tape library apparatus 211 in step 1105 in FIG. 11 in some cases. Meanwhile, in the logical volumes other than the target of the reading-out process, the data of the block read out may be dummy data. In any of the logical volumes, data of the block corresponding to the "line number 1 being restored" is already stored in the disk array apparatus 212.

The control unit 112 refers to storage address information in FIG. 8 corresponding to the LV number of the logical volume being the target of the restoration process, and writes the data of the block restored into the storage area of the disk array apparatus 212 indicated by the beginning address and the ending address Next, the control unit 112 checks whether or not the restoration of all the blocks of the logical volume being the target of the restoration process has been completed (step 1304). When the restoration of all the blocks has not been completed (step 1304, NO), the control unit 112 calculates the restoration processing speed from the block at the restoration start position to the last restored block of the logical volume (step 1305). Then, the control unit 112 updates the "restoration processing speed 1" of the measurement information in FIG. 9 with the calculated restoration processing speed.

Next, the control unit 112 increments the "line number 1 being restored" in the measurement information by 1 (step 1306). However, when the current "line number 1 being restored" is the line number of the last line, the "line number 1 being restored" is updated to the line number of the top line.

Next, the control unit 112 checks whether or not the difference between the "line number 1 being restored" and the "line number being read out" in the measurement information is equal to or smaller than a prescribed value (step 1307). The prescribed value is a value that is sufficiently smaller compared with the "number of lines" in the LVG information in FIG. 6, and may be "1" or "2" for example. When the difference is larger than the prescribed value (step 1307, NO), the control unit 112 repeats the processes in and after step 1303.

On the other hand, when the difference is equal to or smaller than the prescribed value (step 1307, YES), the control unit 112 calculates an initial interval value Lp by expression (1) below, and registers it in the "initial interval value 1" in the measurement information (step 1308).

$$Lp = Vr(L2/Vr - L1/Vp)/Bs \qquad (1)$$

Bs in expression (1) is the block size, and matches the "parity size" in the parity management information in FIG. 5.

L1 is the size of data for which restoration has not been completed, in the data of the logical volume being the target of the restoration process. Here, the total size of the blocks for which restoration has not been completed is used as L1.

While the data is restored using the dummy data and parity of the logical volume being the target of the reading-out process, the difference between the "line number 1 being restored" and the "line number being read out" does not fall equal to or the smaller than the prescribed value. The difference possibly falls equal to or smaller than the prescribed value after the "line number 1 being restored" is updated to the line number of the top line.

In this case, the control unit 112 is able to obtain the total size of the blocks for which restoration has been completed, by using the "line number 1 being restored" in the measurement information in FIG. 9 and Bs. Then, the control unit 112 is able to obtain the total size of the blocks for which restoration has not been completed by subtracting the total size of the blocks for which restoration has been completed from the "LV size 4" in the LVG information in FIG. 6.

L2 is the size of the data for which reading-out has not been completed, in the data of the logical volume being the target of the reading-out process. Here, the total size of the blocks for which reading-out has not been completed is used as L2.

The control unit 112 is able to obtain the total size of blocks for which reading-out has been completed, using the line number being read out" in the measurement information in FIG. 9 and Bs. Then, the control unit 112 is able to obtain the total size of the blocks for which reading-out has not been completed by subtracting the total size of the blocks for which reading-out has been completed from the "LV size 4" in the LVG information in FIG. 6.

Vp is the measurement result of the restoration processing speed of the logical volume using the parity by the control unit 112, and is registered in the "restoration processing speed 1" in the measurement information. Vr is the reading-out processing speed of the logical volume being the target of the reading-out process, and is registered in the "reading-out processing speed" in the measurement information.

L2/Vr in expression (1) is the expected time until reading-out of the logical volume being the target of the reading-out process is completed, and L1/Vp is the expected time until restoration of the logical volume being the target of the restoration process is completed. The initial interval value Lp is the number of lines according to the difference between L2/Vr and L1/Vp.

Since the restoration process using the parity is executed at a higher speed than the reading-out process from the tape library apparatus 211, there is possibly a case in which L1/Vp is shorter than L2/Vr. Then, the control unit 112 is able to perform control so that the end timing of the reading-out process and the end timing of the restoration process become almost equal, by adjusting the position of the line being restored using the initial interval value Lp.

However, the value of the initial interval value Lp is an integer being 1 or larger, and in the calculation of expression (1), the first decimal place is rounded up, and when the value after rounding up is smaller than 1, the calculation result is fixed at 1. The reason for making the initial interval value Lp 1 or larger is that, until the reading out of the block of the same line number as the block of the restoration target is completed, it is impossible to start restoration of the block being the restoration target.

Next, the control unit 112 checks whether or not the difference between the "line number 1 being restored" and the "line number being read out" is equal to or larger than the initial interval value Lp (step 1309). When the difference is smaller than the initial interval value Lp (step 1309, No), the control unit 112 waits until the difference becomes equal to or larger than the initial interval value Lp.

On the other hand, when the difference is equal to or larger than the initial interval value Lp (step 1309, YES), the control unit 112 repeats the processes in and after step 1303. Then, when restoration of all the blocks is completed (step 1304, YES), the control unit 112 terminates the restoration process.

According the copy process based on the first storage control method as described above, at the point of the time when the number of remaining logical volumes becomes 2, the reading-out process of the (N-1)th logical volume and the restoration process of the Nth logical volume are performed in parallel. For this reason, compared with the case of reading out all the logical volumes from the tape library apparatus 211, the time taken to copy data from the tape library apparatus 211 to the disk array apparatus 212 may be shortened.

At this time, by deciding the processing order of the logical volume of the largest size as the Nth in the N pieces of logical volumes belonging to the logical volume group being the copy target, and making the logical volume the target of the restoration process, the amount of data restored using the parity becomes maximum. Since the restoration process using the parity is executed at a higher speed than the reading-out process from the tape library apparatus 211, when the data amount of the restoration process becomes maximum, the effect of shortening the copy processing time becomes large.

Furthermore, by deciding the processing order of the logical volume of the smallest size as the (N-1)th, and making the logical volume the target of the reading-out process, the amount of data read out from the tape library apparatus 211 becomes smallest. For this reason, the effect of shortening the copy processing time becomes larger.

However, the order of the process of the N pieces of logical volumes is not limited to this order, and as long as the size of the Nth logical volume is larger than the size of the (N-1)th logical volume, it may be another order.

In the example of the copy process illustrated in FIG. 14 through FIG. 20, in step 1103 in FIG. 11, the processing order of the LV1 is decided as the first, and the processing order of the LV0 is decided as the second (last). In this example, since the number of the logical volumes belonging to the logical volume group being the copy target is 2, the process in step 1105 is not performed, and the parallel processing in step 1107 is executed from the start. In the parallel processing in step 1107, the reading-out process starts from the block of the line number 0 of the LV1, and the restoration process starts from the block of the line number 11 of the LV0.

First, in the first state illustrated in FIG. 14, the data of the LV1 corresponding to the line number 0 is read out from the tape library apparatus 211 and written into the disk array apparatus 212. Then, using dummy data of the LV1 and the parity corresponding to the line number 11, data of the line number 11 of the LV0 is restored.

Next, in the second state illustrated in FIG. 15, data of the LV1 corresponding to the line number 1 is read out from the tape library apparatus 211 and written into the disk array apparatus 212. Then, using dummy data of the LV1 and the parity corresponding to the line number 12, data of the line number 12 of the LV0 is restored.

After the processes as described above are repeated, in the third state illustrated in FIG. 16, data of the LV1 corresponding to the line number 4 is read out from the tape library apparatus 211 and written into the disk array apparatus 212. Then, using dummy data of the LV1 and the parity corresponding to the line number 16, data of the line number 16 of the LV0 is restored. Here, since the line being restored has reached the last line, the next restoration process is executed from the top line.

Next, in the fourth state illustrated in FIG. 17, data of the LV1 corresponding to the line number 5 is read out from the tape library apparatus 211 and written into the disk array apparatus 212. Then, using dummy data of the LV1 and the parity corresponding to the line number 0, data of the line number 0 of the LV0 is restored.

After the processes as described above are repeated, in the fifth state illustrated in FIG. 18, the data of the LV1 corresponding to the line number 10 is read out from the tape library apparatus 211 and written into the disk array apparatus 212. Then, using dummy data of the LV1 and the parity corresponding to the line number 7 and the parity, data of the line number 7 of the LV0 is restored. Here, since the reading out of all the blocks of the LV1 is completed, the reading-out process is completed.

Next, in the sixth state illustrated in FIG. 19, using dummy data of the LV1 and the parity corresponding to the line number 8, data of the line number 8 of the LV0 is restored.

After the processes as described above are repeated, in the seventh state illustrated in FIG. 20, using dummy data of the LV1 and the parity corresponding to the line number 10, data of the line number 10 of the LV0 is restored. Here, since the restoration of all the blocks of the LV0 is completed, the restoration process is completed.

Next, referring to FIG. 21 through FIG. 30, an embodiment of the case in which the "parity type" is "single parity" in the second storage control method is explained. In this case, the example of the copy process of one logical volume group is the same as the flowchart in FIG. 11.

In this case, in the LVG information in FIG. 6, the "LV size 3" and "LV size 4" may be omitted, and in the measurement information in FIG. 9, "line number 2 being restored", "initial interval value 2" and restoration processing speed 2" may be omitted.

However, in step 1103 in FIG. 11, the control unit 112 decides the processing order of the N pieces of logical volumes belonging to the logical volume group of the copying target as the first through Nth in ascending order of the size, for example.

FIG. 21 is a flowchart of an example of the reading-out process performed in step 1107 in FIG. 11. The target of the reading-out process in FIG. 21 is the logical volume whose processing order is the (N−1) th (logical volume of the second largest size) and the logical volume whose processing order is the Nth (logical volume of the largest size).

Processes in step 2101 through step 2104 are the same as the processes step 1201 through step 1204 in FIG. 12.

When the reading-out of all the blocks is completed in step 2102 (step 2102, YES), the control unit 112 changes the target of the reading-out process from the (N−1) th logical volume to the Nth logical volume (step 2105). Then, the control unit 112 changes the "line number being read out" in the measurement information in FIG. 9 to the last line number.

Figure 22:
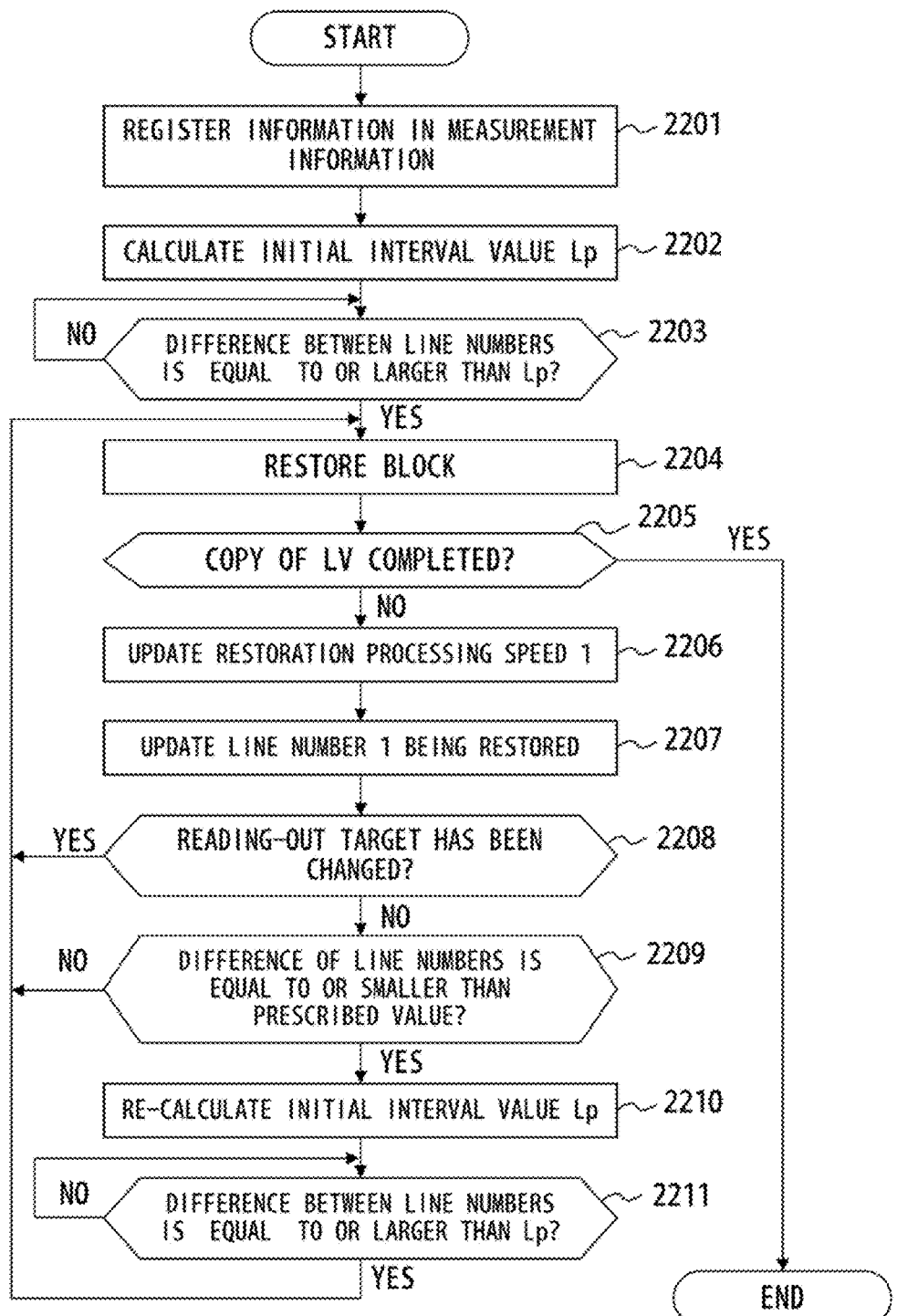
FIG. 22 is a flowchart of a restoration process based on the second storage control method in the case of a single parity.

Accordingly, a parallel processing in which the reading-out process in FIG. 21 and the restoration process in FIG. 22 are performed in parallel for the Nth logical volume is started. At this time, the reading-out process for the Nth logical volume is performed in the direction from the last block towards the top block, and the restoration process for the Nth logical volume is performed in the direction from the top block towards the last block. Therefore, the reading-out process and the restoration process are performed in the opposite directions to each other.

Next, the control unit 112 selects the block corresponding to the "line number being read out" in the blocks of the logical volume being the changed target of the reading-out process (step 2106). Then, the control unit 112 reads out data of the selected block from the tape library apparatus 211 and writes it into the disk array apparatus 212.

At this time, the control unit 112 refers to the LV management information in FIG. 4 corresponding to the LV number of the Nth logical volume, and reads out data of the selected block from the magnetic tape indicated by the storage destination tape number. Next, the control unit 112 refers to the storage address information in FIG. 8 corresponding to the LV number, in the line information in FIG. 7 corresponding to the line number of the selected block. Then, the control unit 112 writes the read-out data into the storage area of the disk array apparatus 212 indicated by the beginning address and the ending address.

Next, the control unit 112 checks whether or not the copy of all the blocks included in the Nth logical volume has been completed (step 2107). It is at the point of time when data of the respective blocks are restored or read out from the tape library apparatus 211 and written into the disk array apparatus 212 that the copy of all the blocks is completed.

When the copy of all the blocks have not been completed (step 2107, NO), the control unit 112 decrements the "line number being read out" in the measurement information by 1 (step 2108), and repeats the processes in and after step 2106. Then, when the copy of all the blocks is completed (step 2107, YES), the reading-out process is terminated.

FIG. 22 is a flowchart illustrating an example of the restoration process performed in step 1107 in FIG. 11. The target of the restoration process in FIG. 22 is the logical volume whose processing order is the Nth (logical volume of the largest size), and the restoration process is executed in parallel with the reading-out process in FIG. 21.

First, the control unit 112 registers the line number of the top line in the "line number 1 being restored" in the measurement information in FIG. 9 (step 2201). Then, a prescribed initial value is registered for the restoration processing speed 1" in the measurement information.

Next, the control unit 112 calculates the initial interval value Lp by expression (1), and registers it in the "initial interval value 1" in the measurement information (step 2202). At this time, the "LV size 1" of the LVG information in FIG. 6 is used as L1, and "LV size 2" is used as L2.

Next, the control unit 112 checks whether or not the difference between the "line number 1 being restored" and the "line number being read out" is equal to or larger than the initial interval value Lp (step 2203). When the difference is smaller than the initial interval value Lp (step 2203, NO), the control unit 112 waits until the difference becomes equal to or larger than the initial interval value Lp.

Meanwhile, when the difference is equal to or larger than the initial interval value Lp (step 2203, YES), the control unit 112 selects the block corresponding to the "line number 1 being restored", in the blocks of the logical volume being the target of the restoration process (step 2204). Then, data of the blocks of other logical volumes and the block of the parity corresponding to the same line number are readout from the disk array apparatus 212. The control unit 112 restores data of the selected block by using the data of the respective blocks read out, and writes the restored data of the block into the disk array apparatus 212.

Next, the control unit 112 checks whether or not the copy of all the blocks of the logical volume being the restoration process has been completed (step 2205). When the restoration of all the blocks has not been completed (step 2205, NO), the control unit 112 calculates the restoration processing speed from the top block to the last restored block of the logical volume (step 2206). Then, the control unit 112 updates the "restoration processing speed 1" in the measurement information in FIG. 9 with the calculated restoration processing speed.

Next, the control unit 112 increments the "line number 1 being restored" by 1 (step 2207), and checks whether or not the target of the reading-out process has been changed from the (N−1)th logical volume to the Nth logical volume (step 2208). When the target of the reading-out process has been changed (step 2208, YES), the control unit 112 repeats the processes in and after step 2204.

Meanwhile, when the target of the reading-out process has not been changed (step 2208, NO), the control unit 112 checks whether or not the difference between the "line number 1 being restored" and the "line number being read out" of the measurement information is equal to or smaller than a prescribed value (step 2209). When the difference is larger than the prescribed value (step 2209, NO), the control unit 112 repeats the processes in and after 2204.

Meanwhile, when the difference is equal to or smaller than the prescribed value (step 2209, YES), the control unit 112 recalculates the initial interval value Lp by expression (1), and registers it in the "initial interval value 1" in the measurement information (step 2210).

At this time, the total size of the blocks for which the restoration has not been completed is used as L1. The control unit 112 is able to obtain the total size of the blocks for which restoration has been completed by using the "line number 1 being restored" of the measurement information in FIG. 9 and Bs. Then, the control unit 112 is able to obtain the total size of the blocks for which restoration has not been completed by subtracting the total size of the blocks for which restoration has been completed from the "LV size 1" of the LVG information in FIG. 6.

Furthermore, the total size of the blocks for which reading-out has not been completed is used as L2. The control unit 112 is able to obtain the total size of the blocks for which reading-out has been completed by using the "line number being read out" of the measurement information in FIG. 9 and Bs. Then, the control unit 112 is able to obtain the total size of the blocks for which reading-out has not been completed by subtracting the total size of the blocks for which reading-out has been completed from the "LV size 2" of the LVG information in FIG. 6.

Next, the control unit 112 checks whether or not the "line number 1 being restored" and the "line number being read out" of the measurement information is equal to or larger than the initial interval value Lp (step 2211). When the difference is smaller than the initial interval value Lp (step 2211, NO), the control unit 112 waits until the difference becomes equal to or larger than the initial interval value Lp.

Meanwhile, when the difference is equal to or larger than the initial interval value Lp (step 2211, YES), the control unit 112 repeats the processes in and after step 2204. Then, when the copy of all the blocks is completed (step 2205, YES), the control unit 112 terminates the restoration process.

According to the copy process based on the second storage control method, in the same manner as the copy process based on the first storage control method, the reading-out process of the (N−1)th logical volume and the restoration process of the Nth logical volume are executed in parallel. For this reason, compared with the case of reading out all the logical volumes from the tape library apparatus 211, the time taken to copy the tape library apparatus 211 to the disk array apparatus 212 may be shortened.

Furthermore, when reading-out of the (N−1)th logical volume is completed, a process to read out a part of the Nth logical volume from the tape library apparatus 211 is started. Accordingly, the process to restore a part of the Nth logical volume and a process to read out another part from the tape library apparatus 211 are executed in parallel. For this reason, the effect of shortening the copy processing time becomes larger.

The processing order of the N pieces of logical volumes is not limited to the ascending order of the size, and as long as the size of the Nth logical volume is larger than the size of the (N−1)th logical volume, it may be another order.

FIG. 23 through FIG. 30 illustrate an example of a copy process in the case in which the "parity type" is "single parity" in the second storage control method. In this example, there are two logical volumes LV0 and LV1 belonging to the logical volume group being the copy target.

In the first state illustrated in FIG. 23, the LV0 corresponds to the logical volume of the largest size, and its size corresponds to 17 blocks. Meanwhile, the LV1 corresponds to the logical volume of the second largest size, and its size corresponds to the 14 blocks. Therefore, the respective storage area of the LV0 and the LV1 in the disk array apparatus 312 is the area of the 17 blocks corresponding to the line number 0 through the line number 16.

In the storage area of the LV1, in the area of the 14 blocks corresponding to the line number 0 through the line number 13, data read out from the tape library apparatus 211 is stored. In addition, in the area of the three blocks corresponding to the line number 14 through the line number 16, dummy data is stored. Meanwhile, in the storage area of the LV0, data restored using data of the LV1 and the parity is stored.

In step 1103 in FIG. 11, the processing order of the LV1 is decided as the first, and the processing order of the LV0 is decided as the second (last). In this case, since the number of the logical volumes belonging to the logical volume group being the copy target is 2, the process in step 1105 is not performed, and the parallel processing in step 1107 is executed from the start. In the parallel processing in step 1107, the reading-out process starts from the block of the line number 0 of the LV1, and the restoration process starts from the block of the line number 0 of the LV0.

First, in the first state illustrated in FIG. 23, data of the LV1 corresponding to the line number 0 is read out from the tape library apparatus 211 and written into the disk array apparatus 212. At this time, assuming that Lp calculated in step 2202 in FIG. 22 is "3", restoration of data of LV0 does not start until the difference between the "line number 1 being restored" and the "line number being read out" becomes "3".

Figure 24:
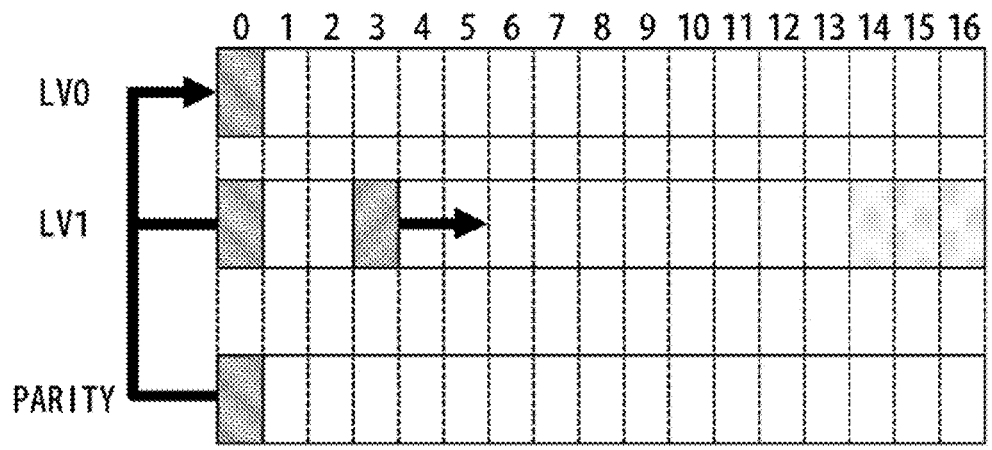
FIG. 24 is a diagram illustrating a second state of a copy process based on the second storage control method in the case of a single parity.

Next, in the second state illustrated in FIG. 24, data of the LV1 corresponding to the line number 3 is read out from the tape library apparatus 211 and written into the disk array apparatus 212. At this time, since the difference between the "line number 1 being restored" and the "line number being read out" has become "3", restoration of data of the LV0 starts, and data of the line number 0 of the LV0 is restored using the data of the LV1 and the parity corresponding to the line number 0.

Figure 25:
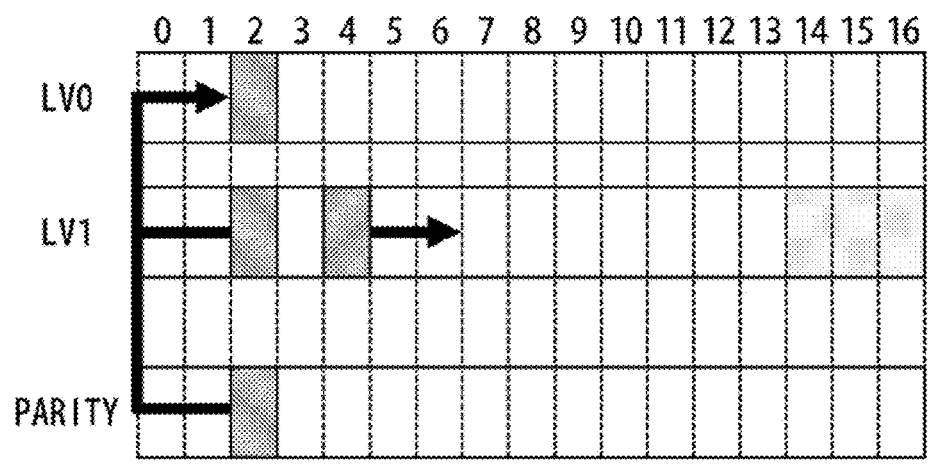
FIG. 25 is a diagram illustrating a third state of a copy process based on the second storage control method in the case of a single parity.

Next, in the third state illustrated in FIG. 25, data of the LV1 corresponding to the line number 4 is read out from the tape library apparatus 211 and written into the disk array apparatus 212. At this time, the restoration process of the LV0 is proceeding faster, and data of the line number 2 of the LV0 is restored using the data of the LV1 and the parity corresponding to the line number 2.

Here, assuming that Lp recalculated in step 2209 is "3", since the difference between the "line number 1 being restored" and "line number being read out" has become smaller than "3", restoration of the LV0 data stops temporarily.

Next, in the fourth state illustrated in FIG. 26, data of the LV1 corresponding to the line number 5 is read out from the tape library apparatus 211 and written into the disk array apparatus 212.

Figure 27:
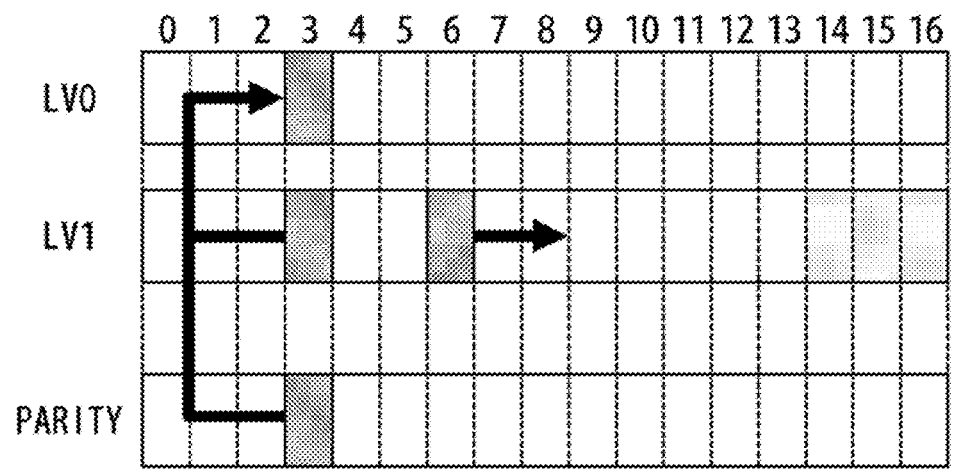
FIG. 27 is a diagram illustrating a fifth state of a copy process based on the second storage control method in the case of a single parity.

Next, in the fifth state illustrated in FIG. 27, data of the LV1 corresponding to the line number 6 is read out from the tape library apparatus 211 and written into the disk array apparatus 212. At this time, since the difference between the "line number 1 being restored" and the "line number being read out" has become "3", restoration of the data of the LV0 resumes, data of the line number 3 of the LV0 is restored using the data of the LV1 and the parity corresponding to the line number 3.

Figure 28:
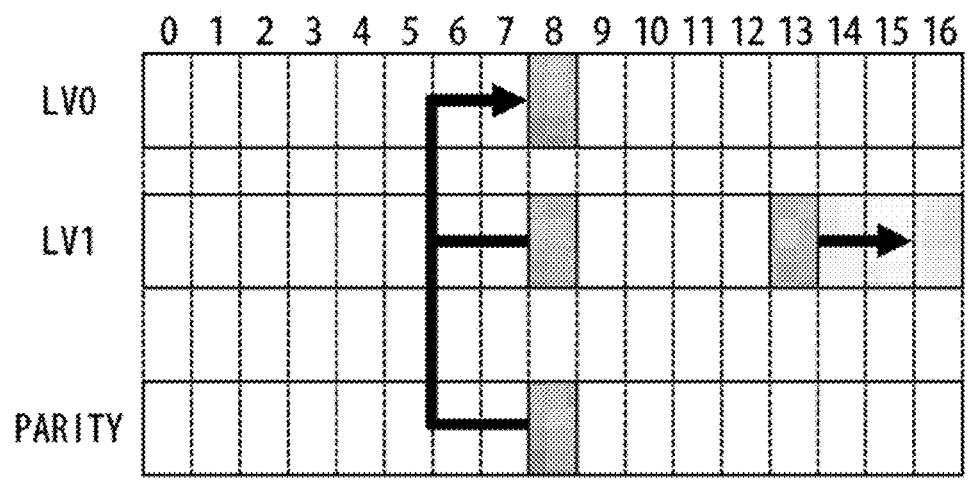
FIG. 28 is a diagram illustrating a sixth state of a copy process based on the second storage control method in the case of a single parity.

After the processes as described above are repeated, in the sixth state illustrated in FIG. 28, data of the LV1 corresponding to the line number 13 is read out from the tape library apparatus 211 and written into the disk array apparatus 212. Then, data of the line number 8 of the LV0 is restored using dummy data of the LLV1 and the parity corresponding to the line number 8.

Here, since reading-out of all the blocks of the LV1 is completed, in step 2105 in FIG. 21, the target of the reading-out process is changed from the LV1 to the LV0, and the "line number being read out" is changed to the line number 16.

Next, in the seventh state illustrated in FIG. 29, data of the LV0 corresponding to the line number 16 is read out from the tape library apparatus 211 and written into the disk array apparatus 212. At this time, the restoration process of the LV0 is proceeding faster, and data of the line number 10 of the LV0 is restored using the data of the LV1 and the parity corresponding to the line number 10.

After the processes as described above are repeated, in the eighth state illustrated in FIG. 30, data of the LV1 corresponding to the line number 14 is read out from the tape library apparatus 211 and written into the disk array apparatus 212. Then, data of the line number 13 of the LV0 is restored using dummy data of the LV1 and the parity corresponding to the line number 13. Here, since the copy of all the blocks of the LV0 is completed, the reading-out process and the restoration process are terminated.

Next, referring to FIG. 31 through FIG. 38, an embodiment in the case in which the "parity type" is "double parity" in the second storage control method is explained.

In this case, in the LVG information in FIG. 6, the "LV size 2" and "LV size 4" may be omitted, and in the measurement information in FIG. 9, the "line number 2 being restored", "initial interval value 2", and "restoration processing speed 2" may be omitted.

Figure 31:
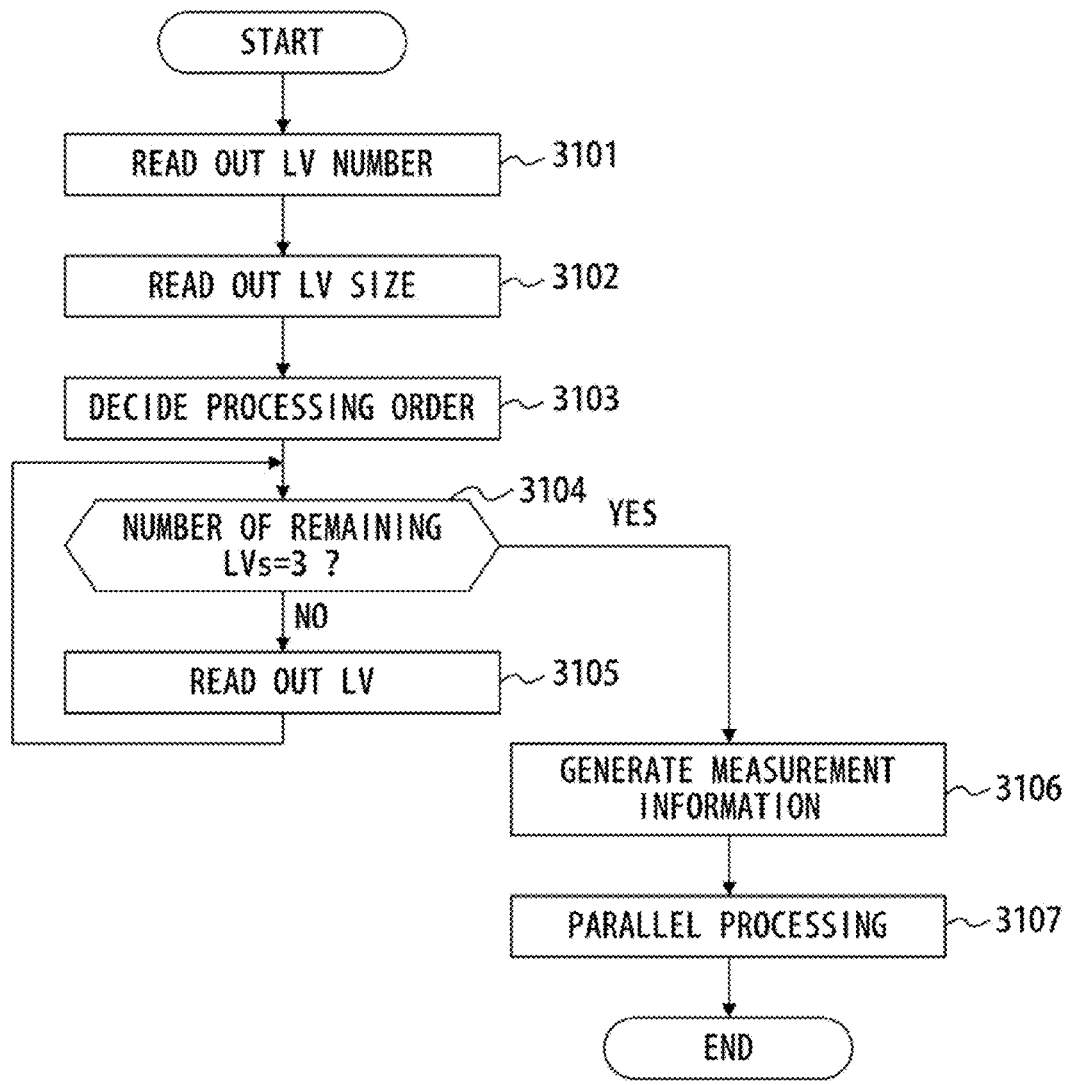
FIG. 31 is a flowchart of a copy process in the case of a double parity.

FIG. 31 is a flowchart illustrating an example of a copy process to read out data of one logical volume from the tape library apparatus 211 and to write it into the disk array apparatus 212.

The processes in step 3101 through step 3103 and step 3105 through step 3107 in FIG. 31 are the same as the processes in step 1101 through step 1103 and step 1105 through step 1107 in FIG. 11.

However, in step 3103, the control unit 112 decides the processing order of the N pieces of the logical volumes belonging to the logical volume group of the copy target as the first through the Nth in ascending order of the size, for example.

Next, the control unit 112 checks whether or not the number of remaining logical volumes for which reading-out has not been completed is 3 (step 3104). When the number of remaining logical volume is equal to or larger than 4 (step 3104, NO), the control unit 112 performs step 3105.

Meanwhile, when the number of remaining logical volumes is 3 (step 3104, YES), the control unit 112 performs processes in and after step 3106.

FIG. 32 is a flowchart illustrating an example of the reading-out process illustrated in step 3107 in FIG. 31. The target of the reading-out process in FIG. 32 is the logical volume whose processing order is the (N−2)th, the logical volume whose processing order is the (N−1) logical volume, and the logical volume whose processing order is the Nth.

The processes in step 3201 through step 3204 in FIG. 32 are the same as the processes in step 1201 through step 1204 in FIG. 12. However, the processes in step 3201 through step 3204 are performed targeted at the (N−2)th logical volume.

When reading-out of all the blocks is completed in step 3202 (step 3202, YES), the control unit 112 changes the target of the reading-out process from the (N−2)th logical volume to the (N−1)th logical volume (step 3205). Then, the control unit 112 changes the "line number being read out" in the measurement information in FIG. 9 to the line number of the last block in the blocks for which restoration has not been completed, in the (N−1)th logical volume.

Figure 33:
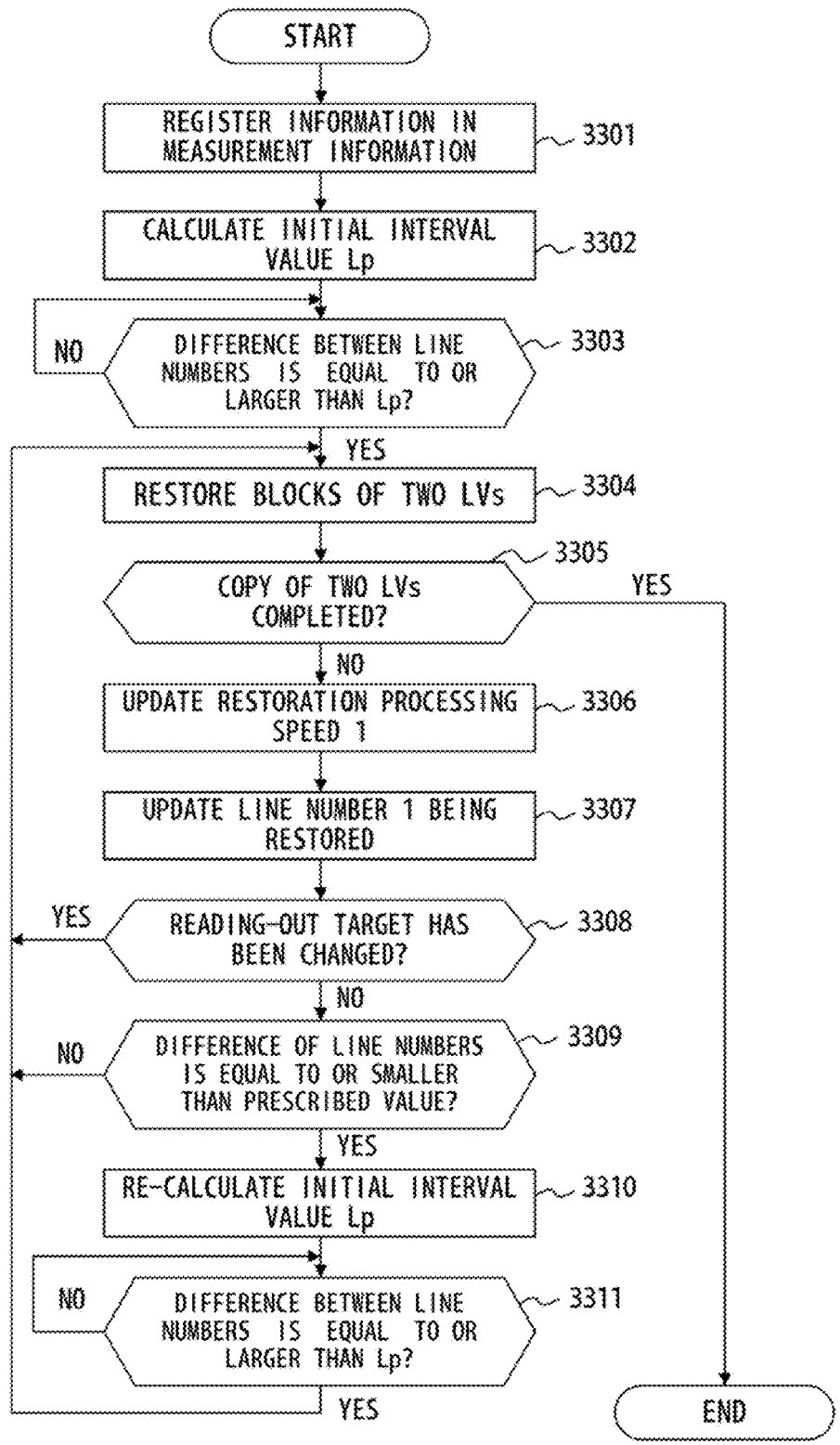
FIG. 33 is a flowchart of a restoration process based on a second storage control method in the case of a double parity.

Accordingly, to the (N−1)th logical volume, a parallel processing in which the reading-out process in FIG. 32 and the restoration process in FIG. 33 are performed in parallel is started. At this time, the reading-out process for the (N−1)th logical volume is performed in the direction from the last block towards the top block, and the restoration process for the (N−1)th logical volume is performed in the direction from the top block towards the last block. Therefore, the restoration process and the restoration process are performed in the opposite directions to each other.

Next, the control unit 112 selects the block corresponding to the "line number being readout", in the blocks of the logical volume being the changed target of the reading-out process (step 3206). Then, the control unit 112 reads out data of the selected block from the tape library apparatus 211 and writes it into the disk array apparatus 212.

Next, the control unit 112 checks whether or not copy of all the blocks included in the (N−1)th logical volume has been completed (step 3207). When copy of all the blocks has not been completed (step 3207, NO), the control unit 112 decrements the "line number being read out" in the measurement information by 1 (step 3208), and repeats the processes in and after step 3206, Then, when the copy of all the blocks is completed (step 3207, YES), the control unit 112 changes the target of the reading-out process from the (N−1)th logical volume to the Nth logical volume (step 3209). Then, the control unit 112 changes the "line number being read out" in the measurement information in FIG. 9 to the line number of the last block in the blocks for which restoration has not been completed, in the Nth logical volume.

Accordingly, to the Nth logical volume, a parallel processing in which the reading-out process in FIG. 32 and the restoration process in FIG. 33 are performed in parallel is started. At this time, the reading-out process for the N-th logical volume is performed in the direction from the last block to the top block, and the restoration process to the Nth logical volume is performed in the direction from the top block to the last block. Therefore, the reading-out process and the restoration process are performed in the opposite directions to each other.

Next, the control unit 112 selects the block corresponding to the "line number being readout", in the blocks of the logical volume being the changed target of the reading-out process (step 3210). Then, the control unit 112 reads out data of the selected block from the tape library apparatus 211 and writes it into the disk array apparatus 212.

Next, the control unit 112 checks whether or not copy of all the blocks include in the Nth logical volume has been completed (step 3211). When copy of all the blocks has not been completed (step 3211, NO), the control unit 112 decrements the "line number being read out" in the measurement information by 1 (step 3212), and repeats the processes in and after step 3210. Then, when copy of all the blocks is completed (step 3211, YES), the reading-out process is terminated.

FIG. 33 is a flowchart illustrating an example of the restoration process performed in step 3107 in FIG. 31. The target of the restoration process in FIG. 33 is the logical volume whose processing order is the Nth and the logical volume whose processing order is the (N−1)th. Two parities used for the restoration process are, for example, parity P and parity Q.

First, the control unit 112 registers the line number of the top line in the "line number 1 being restored" in the measurement information in FIG. 9 (step 3301). Then, the control unit 112 registers a prescribed initial value in the "restoration processing speed 1" in the measurement information.

Next, the control unit 112 calculates the initial interval value Lp by expression (1), and registers it in the "initial interval value 1" (step 3302). At this time, the "LV size 1" in the LVG information in FIG. 6 is used as L1, and the "LV size 3" is used as L2.

Next, the control unit 112 checks whether or not the difference between the "line number 1 being restored" and "line number being read out" in the measurement information is equal to or larger than the initial interval value Lp (step 3303). When the difference is smaller than the initial interval value Lp (step 3303, NO), the control unit 112 waits until the difference becomes equal to or larger than the initial interval value Lp.

Meanwhile, when the difference is equal to or larger than the initial interval value Lp (step 3303, YES), the control unit 112 selects the blocks corresponding to the "line number 1 being restored", in the blocks of the two logical volumes being the target of the restoration process (step 3304). Then, the control unit 112 reads out data of the blocks of other logical volumes and the blocks of the two parities corresponding to the same line number from the disk array apparatus 212. The control unit 112 restores data of the selected blocks of the two logical volumes by using the read-out data of the respective blocks and writes them into the disk array apparatus 212.

Next, the control unit 112 checks whether or not copy all the blocks of the two logical volumes being the target of the restoration process has been completed (step 3305). When copy of all the blocks has not been completed (step 3305, NO), the control unit 112 calculates the restoration processing speed from the top block to the last restored block of the Nth logical volume (step 3306). Then, the control unit 112 updates the "restoration processing speed 1" in the measurement information in FIG. 9 with the calculated restoration processing speed.

Next, the control unit 112 increments the "line number 1 being restored" in the measurement information by 1 (step 3307), and checks whether or not the target of the reading-out process has been changed from the (N−2) th logical volume (step 3308). When the target of the reading-out process has been changed (step 3308, YES), the control unit 112 repeats the processes in and after step 3304.

Meanwhile, when the target of the reading-out process has not been changed (step 3308, NO), the control unit 112 checks whether or not the difference between the "line number 1 being restored" and "line number being read out" is equal to or smaller than a prescribed value (step 3309). When the difference is larger than the prescribed value (step 3309, NO), the control unit 112 repeats the processes in and after step 3304.

On the other hand, when the difference is equal to or smaller than the prescribed value (step 3309, YES), the control unit 112 recalculates the initial interval value Lp by expression (1), and registers it in the "initial interval value 1" in the measurement information (step 3310).

At this time, in the blocks of the Nth logical volume, the total size of the blocks for which restoration has not been completed is used as L1. The control unit 112 is able to obtain the total size of the blocks for which restoration has been completed by using the "line number 1 being restored" in the measurement information in FIG. 9 and Bs. Then, the control unit 112 is able to obtain the total size of the blocks for which restoration has not been completed by subtracting the total size of the blocks for which restoration has been completed from the "LV size 1" in the LVG information in FIG. 6.

Furthermore, in the blocks of the (N−2) th logical volume, the total size of the blocks for which reading-out has not been completed is used as L2. The control unit 112 is able to obtain the total size of the blocks for which reading-out has been completed by using the "line number being read out" in the measurement information in FIG. 9 and Bs. Then, the control unit 112 is able to obtain the total size of the blocks for which reading-out has not been completed by subtracting the total size of the blocks for which reading-out has been completed from the "LV size 3" in the LVG information in FIG. 6.

Next, the control unit 112 checks whether the difference between the "line number 1 being restored" and "line number being read out" in the measurement information is equal to or larger than the initial interval value Lp (step 3311). When the difference is smaller than the initial interval value Lp (step 3311, NO), the control unit 112 waits until the difference becomes equal to or larger than the initial interval value Lp.

Meanwhile, when the difference is equal to or larger than the initial interval value Lp (step 3311, YES), the control unit 112 repeats the processes in and after step 3304. Then, when copy of all the blocks is completed (step 3305, YES), the control unit 112 terminates the restoration process.

According to the copy process based on the second storage control method as described above, the reading-out process of the (N−2)th logical volume and the restoration process of the Nth logical volume are executed in parallel. For this reason, compared with the case in which all the logical volumes are read out from the tape library apparatus 211, the time taken to copy data from the tape library apparatus 211 to the disk array apparatus 212 may be shortened.

Meanwhile, when reading-out of the (N−2)th logical volume is completed, a process to readout apart of the (N−1) th logical volume from the tape library apparatus 211 starts. Accordingly, the process to restore a part of the (N−1)th and Nth logical volumes and the process to read out another part of the (N−1)th logical volume from the tape library apparatus 211 are performed in parallel.

Furthermore, when copy of the (N−1)th logical volume is completed, the process to read out a part of the Nth logical volume from the tape library apparatus 211 starts. Accordingly, the process to restore a part of the (N−1)th and Nth logical volumes and the process to read out another part of the Nth logical volume are performed in parallel. For this reason, the effect of shortening the copy processing time becomes larger.

The processing order of the N pieces of logical volume is not limited to the ascending order of the size. As long as the size of the Nth logical volume is larger than the size of the (N−2)th logical volume, or the size of the (N−1)th logical volume is larger than the size of the (N−2)th logical volume, it may be another order.

FIG. 34 through FIG. 38 illustrates an example of a copy process in the case in which the "parity type" is "double parity" in the second storage control method. In this case, there are three logical volumes LV0, LV1, and LV2 belonging to the logical volume group being the copy target.

Figure 34:
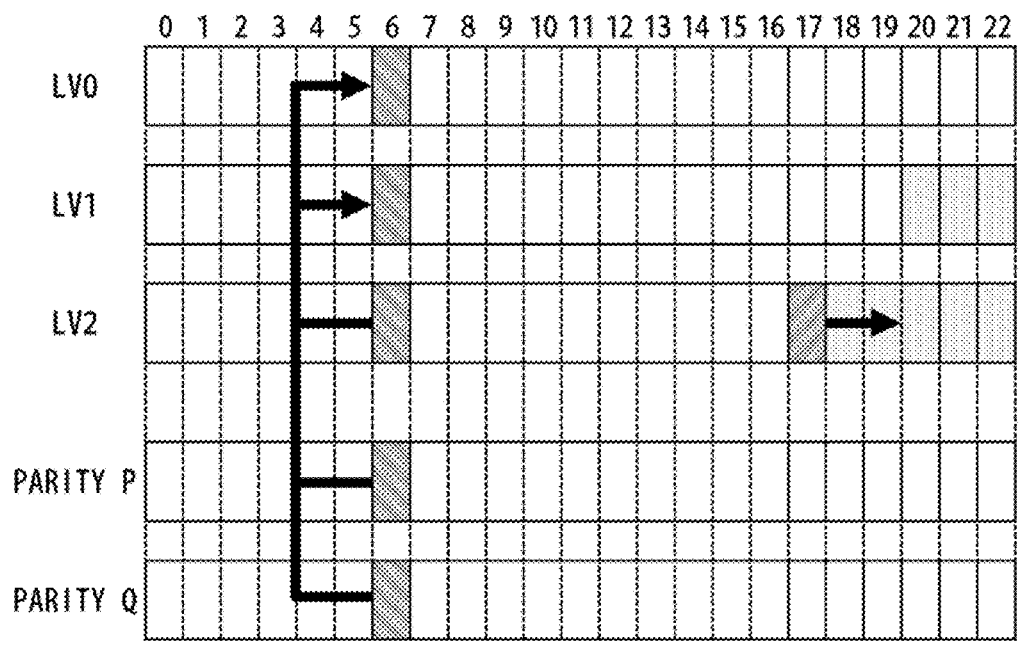
FIG. 34 is a diagram illustrating a first state of a first copy process based on a second storage control method in the case of a double parity.

In the first state illustrated in FIG. 34, the LV0 corresponds to the logical volume of the largest size, and its size corresponds to 23 blocks. The LV1 corresponds to the logical volume of the second largest size, and its size corresponds to 20 blocks. In addition, the LV2 corresponds to the logical volume of the third largest size, and its size corresponds to 18 blocks. Therefore, the respective storage area in the disk array apparatus 212 is the area of 23 blocks corresponding to the line number 0 through line number 22.

In the storage area of the LV2, in the area of 18 blocks corresponding to the line number 0 through line number 17, data read out from tape library apparatus 211 is stored. Meanwhile, in the area of 5 blocks corresponding to the line number 18 through line number 22, dummy data is stored.

In the storage area of the LV1, in the area of 20 blocks corresponding to the line number 0 through line number 19, data restored using data of the LV2, parity P, and parity Q, or data read out from tape library apparatus 211 is stored. Meanwhile, in the area of 3 blocks corresponding to the line number 20 through line number 22, dummy data is stored.

In the storage area of the LV0, data restored using data of the LV2, parity P, and parity Q, or data read out from tape library apparatus 211 is stored.

In step 3103 in FIG. 31, the processing order of the LV2 is decided as the first, the processing order of the LV1 is decided as the second, and the processing order of the LV0 is decided as the third (last). In this example, since the number of logical volumes belonging to the logical volume group being the copy target is 3, the process in step 3105 is not performed, and the parallel processing in step 3107 is performed from the start. In the parallel processing in step 3107, the reading-out process starts from the block of line number 0 in the LV2, and the restoration process starts from the blocks of the line number 0 of the LV0 and the LV1.

First, in the first state illustrated in FIG. 34, the reading-out process and the restoration process have been proceeding already, and data of the LV2 corresponding to the line number 17 is read out from the tape library apparatus 211 and written into disk array apparatus 212. Then, using data of the LV2, parity P, and parity Q corresponding to the line number 6, data of the line number 6 of the LV0 and the LV1 are restored.

Here, since reading-out of all the blocks of the LV2 is completed, in step 3205 in FIG. 32, the target of the reading-out process is changed from the LV2 to the LV1, and the "line number being read out" is changed to the line number 19.

Next, in the second state illustrated in FIG. 35, data of the LV1 corresponding to the line number 19 is read out from the tape library apparatus 211 and written into disk array apparatus 212. Then, using data of the LV2, parity P, and parity Q corresponding to the line number 7, data of the line number 7 of the LV0 and the LV1 are restored.

Figure 36:
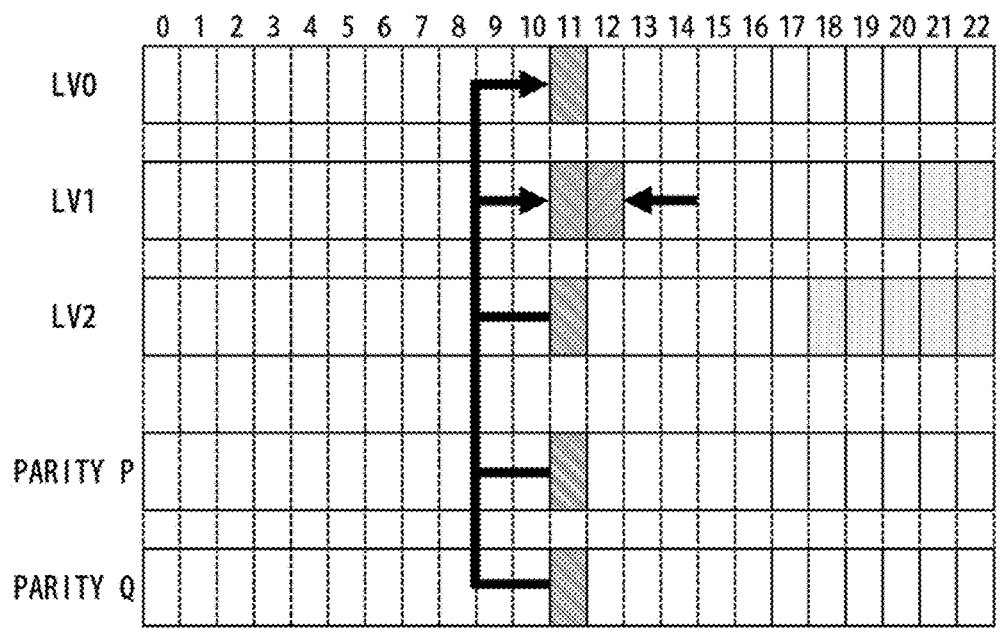
FIG. 36 is a diagram illustrating a third state of a first copy process based on the second storage control method in the case of a double parity.

After the processes as described above are repeated, in the third state illustrated in FIG. 36, data of the LV1 corresponding to the line number 12 is read out from the tape library apparatus 211 and written into disk array apparatus 212. Then, using data of the LV2, parity P, and parity Q corresponding to the line number 11, data of the LV0 and the LV1 corresponding to the line number 11 are restored.

Here, since copy of all the blocks of the LV1 has been completed, in step 3209 in FIG. 32, the target of the reading-out process is changed from the LV1 to the LV0, and the "line number being read out" is changed to the line number 22.

Next, in the fourth state illustrated in FIG. 37, data of the LV0 corresponding to the line number 22 is read out from the tape library apparatus 211 and written into disk array apparatus 212. Then, using data of the LV2, parity P, and parity Q corresponding to the line number 12, data of the line number 12 of the LV0 and the LV1 are restored.

After the processes as described above are repeated, in the fifth state illustrated in FIG. 38, data of the LV0 corresponding to the line number 16 is read out from the tape library apparatus 211 and written into disk array apparatus 212. Then, using data of the LV2, parity P, and parity Q corresponding to the line number 15, data of the line number 15 of the LV0 and the LV1 are restored. Here, since copy of all the blocks of the LV0 has been completed, the reading-out process and the restoration process are terminated.

Next, referring to FIG. 39 through FIG. 45, another embodiment in the case in which the "parity type" is "double parity" in the second storage control method is explained. In this case, the example of the copy process of one logical volume group is the same as the flowchart in FIG. 31, and the example of the reading-out process performed in step 3107 in FIG. 31 is the same as the flowchart in FIG. 32.

However, in step 3107 in FIG. 31, a restoration process using the parity P and parity Q, and a restoration process using only the parity P are performed in parallel with the reading-out process. In this case, in the LVG information in FIG. 6, the "LV size 4" may be omitted.

FIG. 39 is a flowchart illustrating an example of the restoration process using the parity P and parity Q. The target of the restoration process in FIG. 39 is the logical volume whose processing order is the (N−1)th.

First, the control unit 112 registers the line number of the top line in the "line number 2 being restored" in the measurement information in FIG. 9 (step 3901). Then, a prescribed initial value is registered in the "restoration processing speed 2" in the measurement information.

Next, the control unit 112 calculates an initial interval value Lpq by expression (2) below, and registers it in the "initial interval value 2" in the measurement information (step 3902).

$$Lpq = Vr(L2/Vr - L3/Vpq)/Bs \qquad (2)$$

Bs in expression (2) is the block size, and matches the "parity size" of the parity management information in FIG. 5.

L3 is the size of data for which copy has not been completed, in data of the logical volume being the target of the restoration process using the parity P and parity Q. Here, the total size of blocks for which restoration has not been completed is used as L3.

L2 is the size of data for which reading-out has not been completed, in data of the logical volume being the target of the reading-out process. Here, the total size of the blocks for which reading-out has not been completed is used as L2.

In step 3902, the "LV size 2" in the LVG information in FIG. 6 is used as the L3, and the "LV size 3" is used as L2.

Vpq is the measurement result of the restoration processing speed of the logical volume using parity P and parity Q by the control unit 112, and is registered in the "restoration processing speed 2" in the measurement information. Vr is the reading-out processing speed of the logical volume being the target of the reading-out process, and is registered in the "reading-out processing speed" in the measurement information.

The value of the initial interval value Lpq is an integer being 1 or larger, and in the calculation of expression (2), the first decimal place is rounded up, and when the value after rounding up is smaller than 1, the calculation result is fixed at 1.

Next, the control unit 112 checks whether or not the difference between the "line number 2 being restored" and the "line number being read out" in the measurement information is equal to or larger than the initial interval value Lpq (step 3903). When the difference is smaller than the initial interval value Lpq (step 3903, NO), the control unit 112 waits until the difference becomes equal to or larger than the initial interval value Lpq.

On the other hand, when the difference is equal to or larger than the initial interval value Lpq (step 3903, YES), the control unit 112 selects the block corresponding to the "line number 2 being restored", in the blocks of the logical volume being the target of the restoration process (step 3904).

Then, the control unit 112 reads out data of the blocks of other logical volumes and the blocks of the parity P and parity Q corresponding to the same line number from the disk array apparatus 212. However, since the Nth logical volume is the target of the restoration process using only the parity P, data of the Nth logical volume is not read out. The control unit 112 restores the data of the selected block by using the read-out data of the respective blocks, and writes the restored data of the block into the disk array apparatus 212.

Next, the control unit 112 checks whether or not copy of all the blocks of the logical volume being the target of the restoration process has been completed (step 3905). When copy of all the blocks has not been completed (step 3905, NO), the control unit 112 calculates the restoration processing speed from the top block to the last restored block of the logical volume (step 3906). Then, the control unit 112 updates the "restoration processing speed 2" in the measurement information in FIG. 9 with the calculated restoration processing speed.

Next, the control unit 112 increments the "line number 2 being restored" in the measurement information by 1 (step 3907), and checks whether or not the target of the reading-out process has been changed from the (N−2)th logical volume (step 3908). When the target of the reading-out process has been changed (step 3908, YES), the control unit 112 repeats the processes in and after step 3904.

Meanwhile, when the target of the reading-out process has not been changed (step 3908, NO), the control unit 112 checks whether or not the difference between the "line number 2 being restored" and the "line number being read out" in the measurement information is equal to or smaller than a prescribed value (step 3909). When the difference is larger than the prescribed value (step 3909, NO), the control unit 112 repeats the processes in and after step 3904.

On the other hand, when the difference is equal to or smaller than the prescribed value (step 3909, YES), the control unit 112 recalculates the initial interval value Lpq by expression (2), and registers it in the initial interval value 2" in the measurement information (step 3910).

At this time, in the blocks of the logical volume being the target of the restoration process, the total size of blocks for which restoration has not been completed is used as L3. The control unit 112 is able to obtain the total size of blocks for which restoration has been completed by using the "line number 2 being restored" in the measurement information in FIG. 9 and Bs. Then, the control unit 112 is able to obtain the total size of blocks for which restoration has not been completed by subtracting the total size of blocks for which restoration has been completed from the "LV size 2" in the LVG information in FIG. 6.

Furthermore, in the blocks of the logical volume being the target of the reading-out process, the total size of the blocks for which reading-out has not been completed is used as L2. The control unit 112 is able to obtain the total size of the blocks for which reading-out has been completed by using the "line number being read out" in the measurement information in FIG. 9 and Bs. Then, the control unit 112 is able to obtain the total size of the blocks for which reading-out has not been completed by subtracting the total size of the blocks for which reading-out has been completed from the "LV size 3" in the LVG information in FIG. 6.

Next, the control unit 112 checks whether or not the difference between the "line number 2 being restored" and the "line number being read out" in the measurement information is equal to or larger than the initial interval value Lpq (step 3911). When the difference is smaller than the initial interval value Lpq (step 3911, NO), the control unit 112 waits until the difference becomes equal to or larger than the initial interval value Lpq.

On the other hand, when the difference is equal to or larger than the initial interval value Lpq (step 3911, YES), the control unit 112 repeats the processes in and after step 3904. Then, when copy of all the blocks is completed (step 3905, YES), the control unit 112 terminates the restoration process.

FIG. 40 is a flowchart illustrating the restoration process using only the parity P performed in step 3107 in FIG. 31. The target of the restoration process in FIG. 40 is the logical volume whose processing order is the Nth.

First, the control unit 112 registers the line number of the top line in the "line number 1 being restored" in the measurement information in FIG. 9 (step 4001). Then, a prescribed value is registered in the "restoration processing speed 1" in the measurement information.

Next, the control unit 112 calculates the initial interval value Lpq by expression (3) below, and registers in the "initial interval value 1" in the measurement information (step 3902).

$$Lp = Vpq(L2/Vpq - L1/Vp)/Bs \qquad (3)$$

Bs in expression (3) is the block size, and matches the "parity size" in the parity management information in FIG. 5.

L1 is the size of data for which restoration has not been completed, in data of the logical volume being the target of the restoration process using the parity P. Here, the total size of the blocks for which restoration has not been completed is used as L1.

L2 is the size of data for which restoration has not been completed, in data of the logical volume being the target of the restoration process using the parity P and parity Q. Here, the total size of blocks for which restoration has not been completed is used as L2.

In step 3902, the "LV size 1" in the LVG information in FIG. 6 is used as L1, and the "LV size 2" is used as L2.

Vp is the measurement result of the restoration processing speed of the logical volume using only the parity P by the control unit 112, and is registered in the "restoration processing speed 1" in the measurement information. Vpq is the measurement result of the restoration processing speed of the logical volume using the parity P and parity Q by the control unit 112, and is registered in the "restoration processing speed 2" in the measurement information.

The value of the initial interval value Lp is an integer being 1 or larger, and in the calculation of expression (3), the first decimal place is rounded up, and when the value after rounding up is smaller than 1, the calculation result is fixed at 1.

Next, the control unit 112 checks whether or not the difference between the "line number 2 being restored" and the "line number 1 being restored" in the measurement information is equal to or larger than the initial interval value Lp (step 4003). When the difference is smaller than the initial interval value Lp (step 4003, NO), the control unit 112 waits until the difference becomes equal to or larger than the initial interval value Lp.

Meanwhile, when the difference is equal to or larger than the initial interval value Lp (step 4003, YES), the control unit 112 selects the block corresponding to the "line number 1 being restored" in the blocks of the Nth logical volume (step 4004). Then, the control unit 112 reads out data of the blocks of other logical volumes and the block of the parity P corresponding to the same line number from the disk array apparatus 212. The control unit 112 restores the data of the selected block by using the read-out data of the respective blocks, and writes the restored data of the block into the disk array apparatus 212.

Meanwhile, data of the selected block may also be restored using only the parity Q instead of the parity P.

Next, the control unit 112 checks whether or not copy of all the blocks of the Nth logical volume has been completed (step 4005). When copy of all the blocks has not been completed (step 4005, NO), the control unit 112 calculates the restoration processing speed from the top block to the last restored block of the Nth logical volume (step 4006). Then, the control unit 112 updates the "restoration processing speed 1" in the measurement information in FIG. 9 with the calculated restoration processing speed.

Next, the control unit 112 increments the "line number 1 being restored" in the measurement information by 1 (step 4007), and checks whether or not the target of the reading-out process is the Nth logical volume (step 4008). When the target of the reading-out process is the Nth logical volume (step 4008, YES), the control unit 112 repeats the processes in and after step 4004.

Meanwhile, when the target of the reading-out process is the (N−2)th or the (N−1)th logical volume (step 4008, NO), the control unit 112 checks whether the difference between the "line number 2 being restored" and the "line number 1 being restored" in the measurement information is equal to or smaller than a prescribed value (step 4009). When the difference is larger than the prescribed value (step 4009, NO), the control unit 112 repeats the processes in and after step 4004.

On the other hand, when the difference is equal to or smaller than the prescribed value (step 4009, YES), the control unit 112 recalculates the initial interval value Lp by expression (3), and registers it in the "initial interval value 1" (step 4010).

At this time, in the blocks of the Nth logical volume, the total size of the blocks for which restoration has not been completed is used as L1. The control unit 112 is able to obtain the total size of the blocks for which restoration has been completed by using the "line number 1 being restored" in the measurement information in FIG. 9 and Bs. Then, the control unit 112 is able to obtain the total size of the blocks for which restoration has not been completed by subtracting the total size of the blocks for which restoration has been completed from the "LV size 1" in the LVG information in FIG. 6

Furthermore, in the blocks of the (N−1)th logical volume, the total size of blocks for which restoration has not been completed is used as L2. The control unit 112 is able to obtain the total size of blocks for which restoration has been completed by using the "line number 2 being restored" in the measurement information in FIG. 9 and Bs. Then, the control unit 112 is able to obtain the total size of blocks for which restoration has not been completed by subtracting the total size of blocks for which restoration has been completed from the "LV size 2" in the LVG information in FIG. 6.

Here, when the target of the reading-out process is the (N−1)th volume, to the (N−1)th volume, the reading-out process in FIG. 32 and the restoration process in FIG. 39 are performed in parallel. Then, the value obtained by subtracting the total size of blocks for which reading-out has been completed from the total size of blocks for which restoration has not been completed may also be used as L2.

Next, the control unit 112 checks whether or not the difference between the "line number 2 being restored" and the "line number 1 being restored" in the measurement information is equal to or larger than the initial interval value Lp (step 4011). When the difference is smaller than the initial interval value Lp (step 4011, NO), the control unit 112 waits until the difference becomes equal to or larger than the initial interval value Lp.

Meanwhile, when the difference is equal to or larger than the initial interval value Lp (step 4011, YES), the control unit 112 repeats the processes in and after step 4004. Then, when copy of all the blocks is completed (step 4005, YES), the control unit 112 terminates the restoration process.

According to the copy process based on the second storage control method as described above, in the same manner as the case of performing the restoration process in FIG. 33, the time taken to copy data from the tape library apparatus 211 to the disk array apparatus 212 may be shortened.

In addition, when reading-out of the (N−2)th logical volume is completed, the process to readout apart of the (N−1) logical volume from the tape library apparatus 211 starts. Furthermore, when copy of the (N−1)th logical volume is completed, the process to read out a part of the Nth logical volume from the tape library apparatus 211 starts. For this reason, in the same manner as the case of performing the restoration process in FIG. 33, the effect of shortening the copy processing time becomes larger.

The processing order of the N pieces of logical volume is not limited to the ascending order of the size. As long as the size of the Nth logical volume is larger than the size of the (N−2)th logical volume, or the size of the (N−1)th logical volume is larger than the size of the (N−2)th logical volume, it may be another order.

FIG. 41 through FIG. 45 illustrate an example of a copy process in which the reading-out process in FIG. 32, the restoration process in FIG. 39, and the restoration process in FIG. 40 are performed in parallel. In this example, the logical volumes belonging to the logical volume group being the copy target are the same as in the case of the FIG. 34.

In the storage area of the LV1, in the area of 20 blocks corresponding to the line number 0 through line number 19, data restored using data of the LV2, parity P, and parity Q, or data read out from tape library apparatus 211 is stored.

In the storage area of the LV0, data restored using data of the LV1, data of the LV2, and parity P, or data read out from tape library apparatus 211 is stored.

In step 3103 in FIG. 31, the processing order of the LV2 is decided as the first, the processing order of the LV1 is decided as the second, and the processing order of the LV0 is decided as the third (last). In this example, since the number of logical volumes belonging to the logical volume group being the copy target is 3, the process in step 3105 is not performed, and the parallel processing in step 3107 is executed from the start.

In the parallel processing in step 3107, the reading-out process starts from the block of the line number 0 of the LV2. In addition, the restoration process using the parity P and parity Q starts from the block of the line number 0 of the LV1, and the restoration process using only the parity P starts from the block of the line number 0 of the LV0.

Figure 41:
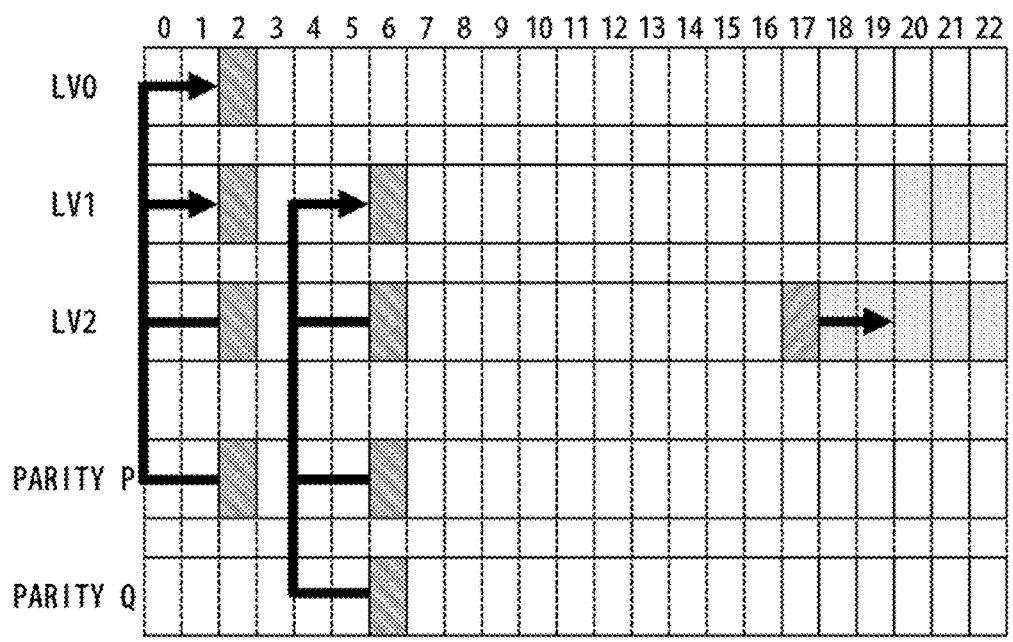
FIG. 41 is a diagram illustrating a first state of a second copy process based on a second storage control method in the case of a double parity.

First, in the first state illustrated in FIG. 41, the parallel processing has been proceeding already, and data of the LV2 corresponding to the line number 17 is read out from the tape library apparatus 211 and written into disk array apparatus 212. Meanwhile, using the data of the LV2, the parity P, and parity Q corresponding to the line number 6, data of the line number 6 of the LV1 is restored. Then, using data of the LV1, data of the LV2, and the parity P corresponding to the line number 2, data of the line number 2 of the LV0 is restored.

Here, since reading-out of all the blocks of the LV2 is completed, in step 3205 in FIG. 32, the target of the reading-out process is changed from the LV2 to the LV1, and the "line number being read out" is changed to the line number 19.

Next, in the second state illustrated in FIG. 42, data of the LV1 corresponding to the line number 19 is read out from the tape library apparatus 211 and written into disk array apparatus 212. Meanwhile, using data of the LV2, the parity P, and parity Q corresponding to the line number 7, data of the line number 7 of the LV1 is restored. Then, using data of the LV1, data of the LV2, and the parity P corresponding to the line number 3, data of the line number 3 of the LV0 is restored.

After the processes as described above are repeated, in the third state illustrated in FIG. 43, data of the LV1 corresponding to the line number 12 is read out from the tape library apparatus 211 and written into disk array apparatus 212. Meanwhile, using data of the LV2, the parity P, and parity Q corresponding to the line number 11, data of the line number 11 of the LV1 is restored. Then, using data of the LV1, data of the LV2, and the parity P corresponding to the line number 7, data of the line number 7 of the LV0 is restored.

Here, since copy of all the blocks of the LV1 of is completed, in step 3209 in FIG. 32, the target of the reading-out process is changed from the LV1 to the LV0, and the "line number being read out" is changed to the line number 22.

Next, in the fourth state illustrated in FIG. 44, data of the LV0 corresponding to the line number 22 is read out from the tape library apparatus 211 and written into disk array apparatus 212. Then, using data of the LV1, data of the LV2, and the parity P corresponding to the line number 9, data of the line number 9 of the LV0 is restored.

After the processes as described above are repeated, in the fifth state illustrated in FIG. 45, data of the LV0 corresponding to the line number 14 is read out from the tape library apparatus 211 and written into disk array apparatus 212. Then, using data of the LV1, data of the LV2, and the parity P corresponding to the line number 13, data of the line number 13 of the LV0 is restored. Here, since copy of all the blocks of the LV0 is completed, the parallel processing is terminated.

The flowcharts in FIG. 10 through FIG. 13, FIG. 21, FIG. 22, FIG. 31 through FIG. 33, FIG. 39, and FIG. 40 are just an example, and a part of the processes may be omitted or changed according to the configuration and conditions of the storage system 201.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage control apparatus comprising:
a processor configured to generate a parity from dummy data attached to a first piece of data among a plurality of pieces of data and a piece of data other than the first piece of data among the plurality of pieces of data when writing the plurality of pieces of data into a first storage apparatus, to store the parity in a second storage apparatus, and to perform a reading-out process to read out the first piece of data from the first storage apparatus and to write the first piece of data into the second storage apparatus in parallel with a restoration process to restore a second piece of data among the plurality of pieces of data by using the dummy data and the parity when reading out the plurality of pieces of data from the first storage apparatus and writing the plurality of pieces of data into the second storage apparatus.

2. The storage control apparatus according to claim 1, wherein
the processor performs the reading-out process in parallel with a restoration process to restore partial data of the second piece of data by using partial data of the first piece of data written into the second storage apparatus and a partial parity of the parity after the restoration process to restore the second piece of data by using the dummy data and the parity ends.

3. The storage control apparatus according to claim 2, wherein
the processor calculates an initial interval value when a difference between a position of partial data being read of the first piece of data and a position of the partial data of the first piece of data being used for restoring the partial data of the second piece of data becomes equal to or smaller than a prescribed value and does not restore next partial data until the difference becomes equal to or larger than the initial interval value.

4. The storage control apparatus according to claim 3, wherein
the processor calculates the initial interval value by using a size of data of the first piece of data for which reading-out has not been completed, a size of data of the second piece of data for which restoration has not been completed, a speed of the reading-out process for the first piece of data, and a speed of the restoration process for the second piece of data.

5. A storage control apparatus comprising: a processor configured to generate a parity from a plurality of pieces of data when writing the plurality of pieces of data into a first storage apparatus, to store the parity in a second storage apparatus, and to perform a reading-out process to read out a first piece of data among the plurality of pieces of data in units of partial data from the first storage apparatus and to write the first piece of data into the second storage apparatus in parallel with a restoration process to restore the first piece of data in units of partial data in an opposite direction to a direction in which the reading-out process is performed for the first piece of data by using a second piece of data among the plurality of pieces of data and the parity when reading out the plurality of pieces of data from the first storage apparatus and writing the plurality of pieces of data into the second storage apparatus.

6. The storage control apparatus according to claim 5, wherein
before performing the reading-out process in parallel with the restoration process, the processor performs a reading-out process to read out the second piece of data from the first storage apparatus and to write the second piece of data into the second storage apparatus in parallel with the restoration process to restore partial data of the first piece of data by using partial data of the second piece of data written into the second storage apparatus and partial parity of the parity.

7. The storage control apparatus according to claim 6, wherein
the processor calculates an initial interval value when a difference between a position of partial data being read of the second piece of data and a position of partial data of the second piece of data being used for restoring partial data of the first piece of data becomes equal to or smaller than a prescribed value and does not restore next partial data until the difference becomes equal to or larger than the initial interval value.

8. The storage control apparatus according to claim 7, wherein
the processor calculates the initial interval value by using a size of data of the second piece of data for which reading-out has not been completed, a size of data of the first piece of data for which restoration has not been completed, a speed of the reading-out process for the second piece of data, and a speed of the restoration process for the first piece of data.

9. A storage system comprising:
a first storage apparatus;
a second storage apparatus; and
a storage control apparatus configured to generate a parity from dummy data attached to a first piece of data among a plurality of pieces of data and a piece of data other than the first piece of data among the plurality of pieces of data when writing the plurality of pieces of data into the first storage apparatus, to store the parity in the second storage apparatus, and to perform a reading-out process to read out the first piece of data from the first storage apparatus and to write the first piece of data into the second storage apparatus in parallel with a restoration process to restore a second piece of data among the plurality of pieces of data by using the dummy data and the parity when reading out the plurality of pieces of data from the first storage apparatus and writing the plurality of pieces of data into the second storage apparatus.

10. A storage system comprising:
a first storage apparatus;
a second storage apparatus; and
a storage control apparatus configured to generate a parity from a plurality of pieces data when writing the plurality of pieces of data into the first storage apparatus, to store the parity in the second storage apparatus, and to perform a reading-out process to read out a first piece of data among the plurality of pieces of data in units of partial data from the first storage apparatus and to write the first piece of data into the second storage apparatus in parallel with a restoration process to restore the first piece of data in units of partial data in an opposite direction to a direction in which the reading-out process is performed for the first piece of data by using a second piece of data among the plurality of pieces of data and the parity when reading out the plurality of pieces of data from the first storage apparatus and writing the plurality of pieces of data into the second storage apparatus.

* * * * *